US009880017B2

(12) United States Patent
Fowe et al.

(10) Patent No.: US 9,880,017 B2
(45) Date of Patent: Jan. 30, 2018

(54) METHOD AND APPARATUS FOR CREATING AN ORIGIN-DESTINATION MATRIX FROM PROBE TRAJECTORY DATA

(71) Applicant: HERE GLOBAL B.V., Eindhoven (NL)

(72) Inventors: James Adeyemi Fowe, Evanston, IL (US); Toby Tennent, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 55 days.

(21) Appl. No.: 14/256,751

(22) Filed: Apr. 18, 2014

(65) Prior Publication Data
US 2015/0300835 A1    Oct. 22, 2015

(51) Int. Cl.
*G01C 21/00*  (2006.01)
*G01C 21/36*  (2006.01)
(Continued)

(52) U.S. Cl.
CPC ......... *G01C 21/3605* (2013.01); *G01C 21/20* (2013.01); *G08G 1/012* (2013.01);
(Continued)

(58) Field of Classification Search
None
See application file for complete search history.

(56) References Cited

U.S. PATENT DOCUMENTS

| 8,532,648 B2 | 9/2013 | Moritz et al. | |
| 2009/0043486 A1* | 2/2009 | Yang | G01C 21/3492 701/117 |

(Continued)

FOREIGN PATENT DOCUMENTS

| DE | 19858477 A1 | 7/2000 | |
| DE | 19948877 A1 * | 4/2001 | .......... G08G 1/0104 |

(Continued)

OTHER PUBLICATIONS

Notification of Transmittal of The International Search Report and The Written Opinion of The International Searching Authority, or The Declaration; Written Opinion of The International Searching Authority; International Search Report; for corresponding International Application No. PCT/EP2015/057830, dated Jul. 2, 2015, 13 Pages.

(Continued)

*Primary Examiner* — Lail Kleinman
(74) *Attorney, Agent, or Firm* — Ditthavong & Steiner, P.C.

(57) ABSTRACT

An approach is provided for creating an origin-destination matrix from probe trajectory data. The approach includes receiving probe trajectory data, wherein the probe trajectory data is associated with at least one subset of a plurality of travel nodes. The approach further includes processing and/or facilitating a processing of the probe trajectory data to construct one or more microscopic origin-destination matrices, wherein the at least one microscopic origin-destination matrix represents one or more preferred travel paths through the subset of the plurality of travel nodes. The approach also involves causing, at least in part, an aggregation of the one or more microscopic origin-destination matrices to construct at least one aggregated origin-destination matrix to represent the plurality of travel nodes.

20 Claims, 16 Drawing Sheets

(51) Int. Cl.
  *G01C 21/20* (2006.01)
  *G08G 1/01* (2006.01)
(52) U.S. Cl.
  CPC ......... *G08G 1/0112* (2013.01); *G08G 1/0116* (2013.01); *G08G 1/0129* (2013.01)

(56) References Cited

U.S. PATENT DOCUMENTS

| | | | |
|---|---|---|---|
| 2009/0099760 A1 | 4/2009 | Lederman et al. | |
| 2014/0024389 A1 | 1/2014 | Martinez et al. | |
| 2014/0058652 A1* | 2/2014 | Duan | G08G 1/00 701/117 |
| 2015/0213055 A1* | 7/2015 | Ballegeer | G01C 21/32 707/738 |

FOREIGN PATENT DOCUMENTS

| | | |
|---|---|---|
| DE | 10334140 A1 | 2/2004 |
| EP | 2009610 A2 | 12/2008 |
| EP | 2667334 A1 | 11/2013 |

OTHER PUBLICATIONS

Tornero et al., "A Multi-Agent System for Obtaining Dynamic Origin/Destination Matrices on Intelligent Road Networks" 6th Euro American Conference on Telematics and Information Systems (EATIS), May 23, 2012, 8 Pages.

Mellegard, "Obtaining Origin/Destination-matrices from cellular network data", Master's Thesis in Engineering Mathematics, Chalmers University of Technology, Jan. 1, 2011, retrieved on Jul. 9, 2015 from http://publications.lib.chalmers.se/records/fulltext/154702.pdf, 44 Pages.

Hu et al., "Estimation of Network Origin-Destination Demands Using Heterogeneous Vehicle Sensor Information: An Optimal Sensor Deployment Policy", IEEE Forum on Integrated and Sustainable Transportation System, Jun. 29, 2011, 6 Pages.

* cited by examiner

DOWNSTREAM WEIGHT MATRIX FOR NETWORK GRAPH

| X | 1201 | 1202 | 1203 | 1204 | 1205 | 1206 | 1207 | 1208 | 1209 | 1210 | 1211 | 1212 | 1213 | 1214 |
|---|---|---|---|---|---|---|---|---|---|---|---|---|---|---|
| 1201 | X | (3,6) | | | | | | | | | | | | |
| 1202 | | X | (3,6) | (13,6) | | | | | | | | | | |
| 1203 | | (3,6) | X | (3,3,16) | (3,3,61) | (2,6) | | (3,2) | | | | | | |
| 1204 | | (13,6) | | X | | | | (1,3,16) | (23,26) | | | | | |
| 1205 | | | (4,6) | (5,6) | X | | | (5,62) | | | | | | |
| 1206 | | | (7,6) | (31,16) | | X | | (2,6) | | | | | | |
| 1207 | | | | | | | X | | | | | | | |
| 1208 | | (23,8,16) | (31,61) | | -3,3 | | (13,18) | X | | | (3,8) | | | |
| 1209 | | | | | | (23,26) (3,6) | (31,9) | (3,26) | X | | (12,3,6) | (3,6) | | |
| 1210 | | | | | | | (3,6) | | | X | (3,6) | | | |
| 1211 | | | | | | | | | (3,6) | | X | | (3,46) | |
| 1212 | | | | | | | | | | X | | X | | |
| 1213 | | | | | | | | | | | | (33,36) | X | |
| 1214 | | | | | | | | | | | | | | X |

FIG. 13B DOWNSTREAM WEIGHT MATRIX FOR OD

METHOD AND APPARATUS FOR CREATING AN ORIGIN-DESTINATION MATRIX FROM PROBE TRAJECTORY DATA

BACKGROUND

Service providers are continually challenged to deliver value and convenience by providing compelling network services such as travel and/or traffic management through, for example, Dynamic Traffic Assignment (DTA). The DTA can provide assistance in understanding the overall impact of traffic control, incidents, road closures, new roads, constructions, etc., on the entire network. Current attempts to build DTA networks face challenges in trying to determine Origin-Destination (OD) travel demands since OD information is typically necessary to determine the fastest trip-time and alternative travel paths on a road network. Further, GPS probe data is anonymized for privacy reasons and therefore does not supply the quality required to build a citywide OD-matrix for a transportation network.

SOME EXAMPLE EMBODIMENTS

Therefore, there is a need for an approach for providing an origin-destination matrix using probe trajectory data.

According to one embodiment, a method comprises receiving probe trajectory data, wherein the probe trajectory data is associated with at least one subset of a plurality of travel nodes. The method also comprises processing and/or facilitating a processing of the probe trajectory data to construct one or more microscopic origin-destination matrices, wherein the at least one microscopic origin-destination matrix represents one or more preferred travel paths through the subset of the plurality of travel nodes. The method further comprises causing, at least in part, an aggregation of the one or more microscopic origin-destination matrices to construct at least one aggregated origin-destination matrix to represent the plurality of travel nodes.

According to another embodiment, an apparatus comprises at least one processor, and at least one memory including computer program code for one or more computer programs, the at least one memory and the computer program code configured to, with the at least one processor, cause, at least in part, the apparatus to receive probe trajectory data, wherein the probe trajectory data is associated with at least one subset of a plurality of travel nodes. The apparatus is also caused to process and/or facilitate a processing of the probe trajectory data to construct one or more microscopic origin-destination matrices, wherein the at least one microscopic origin-destination matrix represents one or more preferred travel paths through the subset of the plurality of travel nodes. The apparatus is further caused to cause, at least in part, an aggregation of the one or more microscopic origin-destination matrices to construct at least one aggregated origin-destination matrix to represent the plurality of travel nodes.

According to another embodiment, a computer-readable storage medium carries one or more sequences of one or more instructions which, when executed by one or more processors, cause, at least in part, an apparatus to receive probe trajectory data, wherein the probe trajectory data is associated with at least one subset of a plurality of travel nodes. The apparatus is also caused to process and/or facilitate a processing of the probe trajectory data to construct one or more microscopic origin-destination matrices, wherein the at least one microscopic origin-destination matrix represents one or more preferred travel paths through the subset of the plurality of travel nodes. The apparatus is further caused to cause, at least in part, an aggregation of the one or more microscopic origin-destination matrices to construct at least one aggregated origin-destination matrix to represent the plurality of travel nodes.

According to another embodiment, an apparatus comprises means for receiving probe trajectory data, wherein the probe trajectory data is associated with at least one subset of a plurality of travel nodes. The apparatus also comprises means for processing and/or facilitating a processing of the probe trajectory data to construct one or more microscopic origin-destination matrices, wherein the at least one microscopic origin-destination matrix represents one or more preferred travel paths through the subset of the plurality of travel nodes. The apparatus further comprises means for causing, at least in part, an aggregation of the one or more microscopic origin-destination matrices to construct at least one aggregated origin-destination matrix to represent the plurality of travel nodes.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 11-17 and 31-40.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 13A-13B are diagrams for a sample deterministic OD-matrix built from probe trajectory data, according to one embodiment;

DESCRIPTION OF SOME EMBODIMENTS

Examples of a method, apparatus, and computer program for providing an origin-destination matrix using probe trajectory data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term transportation networks refer to roadways within a given area (e.g., city, town, county, etc.). Although various embodiments are described with respect to transportation networks, it is contemplated that the approach described herein may be used with other networks wherein sufficient data and a base map may be available such as pedestrian walkway networks (e.g., city, mall, amusement park, etc.), trains, maritime, etc. Additionally, it is contemplated that the approach described herein may be used with multiple overlapping networks such as, for example, roadways, train, and pedestrian networks or maritime, train and freight networks.

Figure 1:
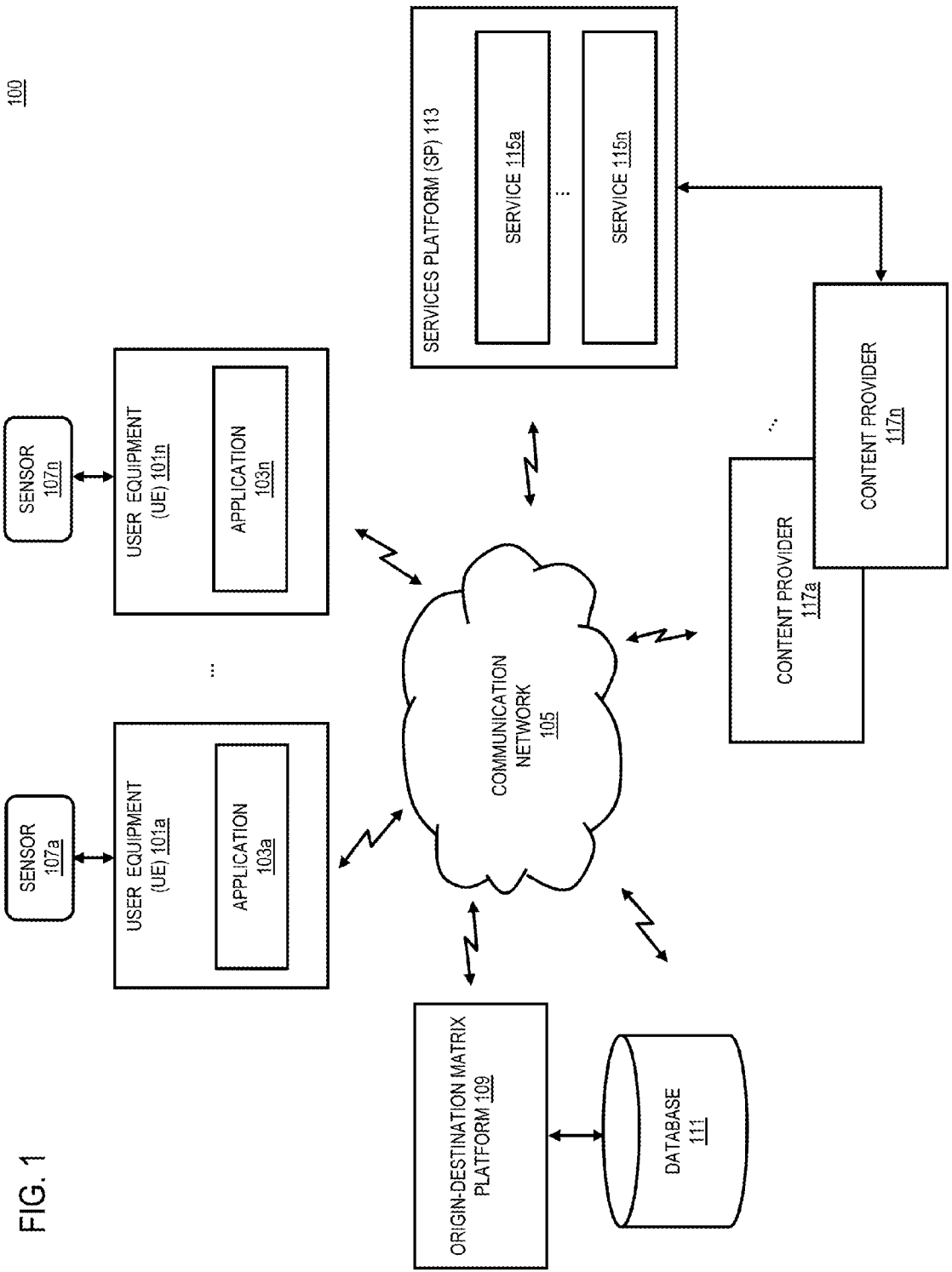
FIG. 1 is a diagram of a system capable of providing an origin-destination matrix using probe trajectory data, according to one embodiment.

FIG. 1 is a diagram of a system capable of providing an origin-destination matrix using probe trajectory data, according to one embodiment. Transportation Demand Management (TDM) is a field concerned with efficiently utilizing the transportation road network as travel demand increases and changes in a dynamic network. To date, building DTA for a network is a rigorous and time consuming manual process where the OD travel demands from one region of the network to the others are captured to form an OD-matrix. This OD-matrix is then used in DTA to understand fastest trip-time and alternative travel paths on a road network. Global position system (GPS) probe data, or probe trajectory, is generally regarded to lack the quality required to build a citywide OD-Matrix for a transportation network because of the anonymization GPS probe data undergoes due to privacy concerns. Probe trajectory data may additionally be macroscopic and microscopic probe paths. Thus, it is impossible to trace a single GPS from its actual origin point to its destination point as the vehicle tracking ID would have been changed en-route.

The main TDM raw material is the OD-matrices and it is under high demand. OD-matrices are in high demand because the method used today in computing OD for cities are too expensive and cannot easily scale. For example, some of the methods used to compute OD for cities include: sharing survey papers, using cameras to capture traffic at certain times of day, or manual car counting by people positioned at different intersections. The transportation industry already knows that this method is not scalable, as they would rather pay for an automated solution powered by an algorithm that uses probe trajectory data.

To address this problem, a system 100 of FIG. 1 introduces the capability to provide an origin-destination matrix using probe trajectory data. This invention shows how to build a DTA on a transportation network and understand the overall impact of traffic control, incidents, road closures, new roads, constructions, etc., on the entire network. This invention finds the most approximate solution to this problem by using microscopic OD-matrices to build a holistic network wide stochastic DTA that can cover an entire city and elicit the general direction of traffic flow in real time using time dependent deterministic and stochastic OD-matrices. This invention maintains a real time, big picture view of the entire transportation network. For example, a whole city (FIG. 8) can be modeled and monitored, such that in-going traffic demands into the city, outgoing traffic from the city and internal traffic demands within the city are known and tracked in real time. If one of the roads has an incident, the DTA application is able to identify the corresponding rerouting strategy that drivers would opt for and the expected strain the incident would have on specific areas of the transportation network.

This invention shows a method to automatically perform DTA on probe trajectory data within a very short time compared to the time consuming and tenuous manual process available today. Even though some software is capable of performing DTA, most of the software do not use probe trajectory data only and comparatively takes a substantially longer time to build the OD-matrix that powers this type of software. This invention provides the much needed automated solution for performing DTA using probe trajectory data only and it easily scales globally.

Figure 9A:
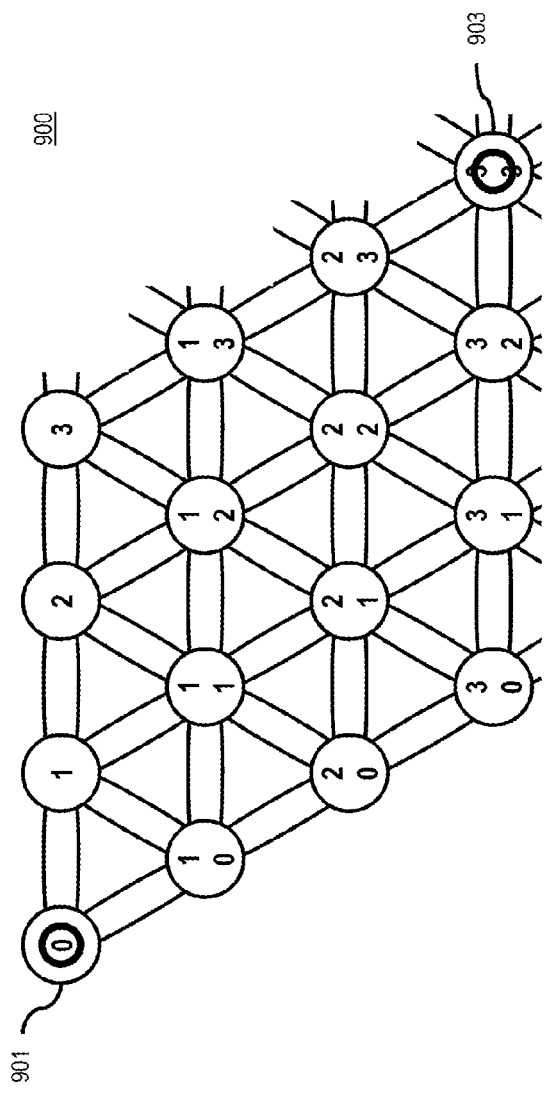
FIGS. 9A-9B are diagrams of a sample transportation network and a probe trajectory with sequential links, according to one embodiment.

In an exemplary embodiment the system 100 exploits GPS probe trajectories to understand the general direction of traffic flow in a transportation network. A typical transportation network as shown in FIG. 9A has several possible routes a vehicle can take from an origin node 901 to a destination node 903. The classical well-known shortest path algorithm can be used to predict the likely route the driver would take from an origin to a destination (assuming shortest path). However if there is a road closure on one of the roads en-route to the shortest path, what alternate routing strategy does the driver take to its destination within the time period? What alternate routing strategies would many other drivers take to a similar destination or other destinations?

These questions are answered by the system 100 using Dynamic Traffic Assignment on OD-matrix, built from known origin destination routes taken by GPS probe trajectories. However, in the case of probe trajectory data, the deterministic OD-matrix is lightweight and localized on small regions of the network where the best data one may access are very short probe trajectories or probe-paths because some GPS probe providers anonymize their data set and the data loses vehicle ID information such that it is not possible to ascertain the exact longer distance destination. The system 100 also solves this problem by building a stochastic OD-matrix that overrides the anonymous data and estimates OD values for the unknowns in the deterministic OD-matrix. It is of interest to extract the best possible information out of these probe trajectories and show how the probe trajectories help in solving these problems.

As shown in FIG. 1, the system 100 comprises a user equipment (UE) 101a-101n (hereinafter, UE 101) having connectivity to an OD-matrix platform 109 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a GPS unit, mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The user may use one or more applications 103a-103n (hereinafter, applications 103, e.g., thematic effect applications, a map application, a location services application, a content service application, etc.) on the UEs 101. In this manner, the user may activate an application 103. The application 103 can utilize a sensor 107a-107n (hereinafter, sensors 107) to provide location and/or orientation of the UE 101. In certain embodiments, one or more GPS satellites may be utilized in determining the location of the UE 101. The UE 101 can determine a location of the UE 101, an orientation of the UE 101, or a combination thereof to present the content and/or add additional content.

By way of example, the sensors 107a-107n (hereinafter, sensors 107) may be any type of sensor. In certain embodiments, the sensors 107 may include, for example, a camera/imaging sensor for gathering image data, an audio recorder for gathering audio data, a global positioning sensor for gathering location data, a network detection sensor for detecting wireless signals or network data, temporal information and the like. In one scenario, the sensors 107 may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, WiFi, near field communication, etc.).

By way of example, the UE 101, OD-matrix platform 109, and services platform 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the database 111 may store probability information for preferred travel paths for specific travel nodes from the sensors 107, OD-matrix platform 109, services platform 113 and/or content provider 117, for the OD-matrix platform 109 to access at a later date. In one embodiment, the database 111 may store mapping data and/or probe trajectory data, as associated with a subset of travel nodes. In one embodiment, the probe trajectory data may include satellite-based location probe data. In one embodiment, the probe trajectory data may be collected from the sensors 107, OD-matrix platform 109, services platform 113 and/or content provider 117. In one embodiment, the database 111 may store microscopic OD-matrices and its associated preferred travel paths through the subset of nodes. In one embodiment, the database 111 may store aggregated OD-matrices. In one embodiment, the OD-matrix platform 109 may include and/or have access to the database 111 to access and/or store information associated with the aggregated OD-matrices, microscopic OD-matrices, probe trajectory data, mapping data, preferred route data, and probability information data and/or travel node data.

The services platform 113 may include any type of service. By way of example, the services platform 113 may include mapping services, navigation services, travel planning services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the OD-matrix platform 109 and the content provider 117 to supplement or aid in the processing of the content information.

By way of example, services 115 may be an online service that reflects preferred routes of users at various travel nodes and/or probe trajectories. In one scenario, the services 115 provide representations of each travel node with probability information data, associated probe trajectories, mapping data, and a variety of additional information. The services 115 allow users to access location information, activities information, contextual information, historical user information and interests within and/or outside their travel trajectories, and provides for data portability. The services 115 may additionally assist in providing the OD-matrix platform 109 with travel information of the one or more probe trajectories.

The content provider 117 may provide content to the UE 101, the OD-matrix platform 109, and the services 115 of the services platform 113. The content provided may be any type of content, such as textual content, audio content, video content, image content, etc. In one embodiment, the content provider 117 may provide content that may supplement content of the applications 103, the sensors 107, or a combination thereof. By way of example, the content provider 117 may provide content that may process content items of interest associated with various routes, OD matrices, preferred route data, probability information data, and/or mapping data. In one embodiment, the content provider 117 may also store content items associated with the UE 101, the OD-matrix platform 109, and the services 115 of the services platform 113. In another embodiment, the content provider 117 may manage access to a central repository of data, and offer a consistent, standard interface to data, such as a repository of users' navigational data content.

As shown in FIG. 9A, a probe-path, or probe trajectory, is the set of sequential links traversed by a driver en-route from origin to destination. A general representation and labelling can be as described in FIG. 9B where a probe trajectory is expected to have a sequential number of links on the path and a subset of congested links or speed profile for all the links.

Figures 10A, 10B:
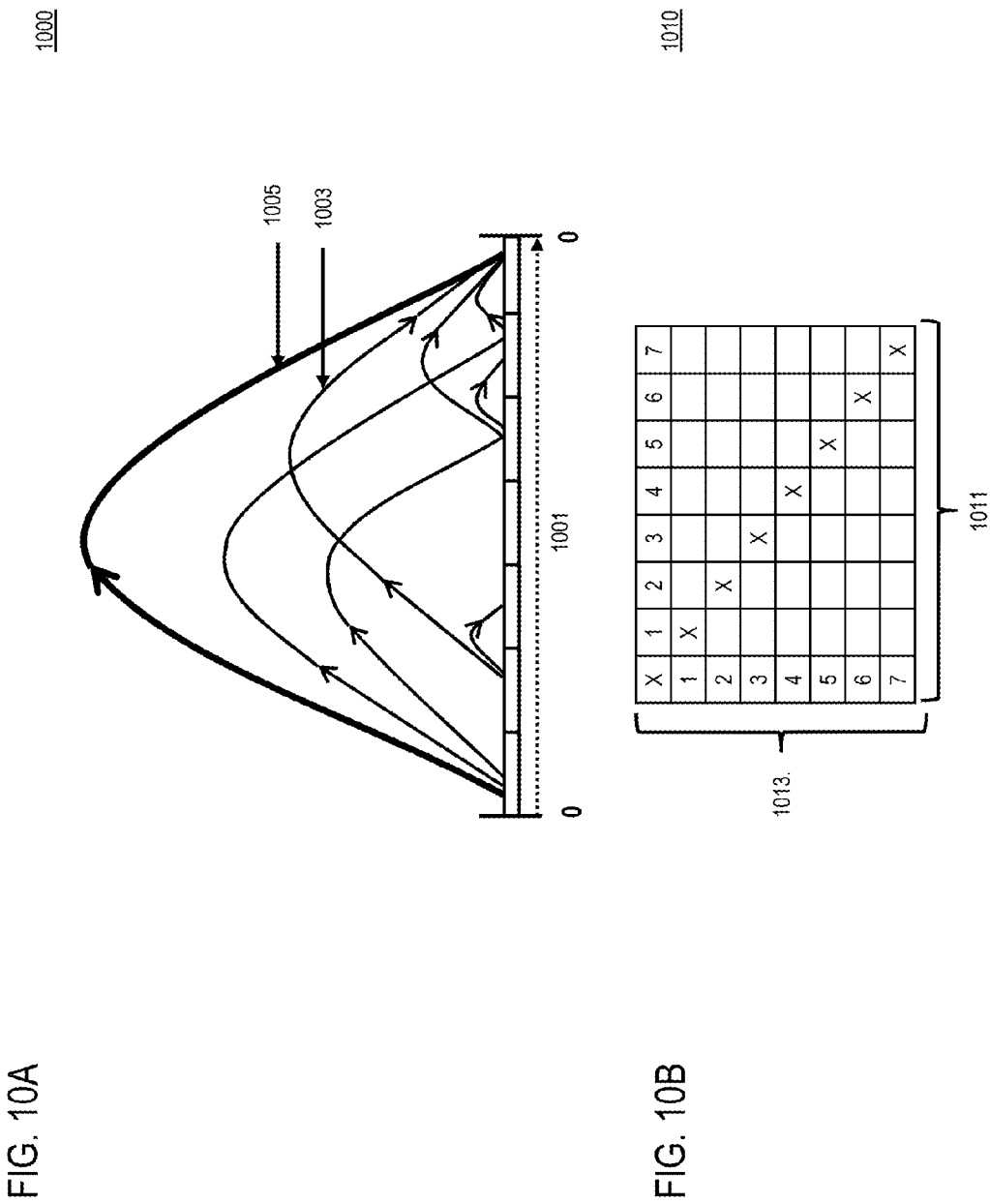
FIGS. 10A-10B are diagrams of a microscopic OD-matrix, according to one embodiment.

From probe trajectories, microscopic OD-matrices are extracted that exploits the sequential links in a probe trajectory to identify turning movement of vehicles at an interception and thereby knowing the most popular and/or preferred routes for various ODs. FIG. 10A shows how micro-probe trajectories are extracted from every probe trajectory on the network in order to build a microscopic OD-matrix. The 7-links by 7-links matrix box shown can contain the count of the total number of routes and/or paths that a vehicle took from the row-link (upstream) to the column-link (downstream). The idea is that although we do not see the entire journey and/or trajectory of a UE 101, the OD-matrix platform 109 can make do with the short-paths generated by the UE 101.

This microscopic OD-matrix does not only show all the best possible OD data available in a UE 101 (e.g., GPS probe trajectory data), it also elicits the amount of traffic that is moving from one link to the other; a relative measurement of the traffic density on the network. If these matrices are aggregated into a large OD-matrix, for example, for the citywide transportation network, then probe-path counts that are spatially biased within local regions may be collected from the UE 101, because, for example, some-to-many GPS routes may not cover long distances (city end to end).

A sample micro scale example was created using approximately four years of data from a probe archive, in Table 1 below. In Example 1, the percentage of unique vehicles per day seen to pass over a stretch of highway and continue on, compared to the percentage which were seen to take an off-ramp, is investigated (see FIG. 11A). In Example 2, the percentage of unique vehicles per day which were seen to turn left, against the percentage of vehicles seen to turn right, is investigated (see FIG. 11B). Table 1 details the results of this illustration.

TABLE 1

Results from examining vehicle path

| Example 1 | | Example 2 | |
| --- | --- | --- | --- |
| Destination | % population | Destination | % population |
| Continue downstream on Highway | 93 | South from ramp (turned right) | 66 |

TABLE 1-continued

Results from examining vehicle path

| Example 1 | | Example 2 | |
|---|---|---|---|
| Destination | % population | Destination | % population |
| Off ramp | 7 | North from ramp (turned left) | 34 |

Figure 11B:
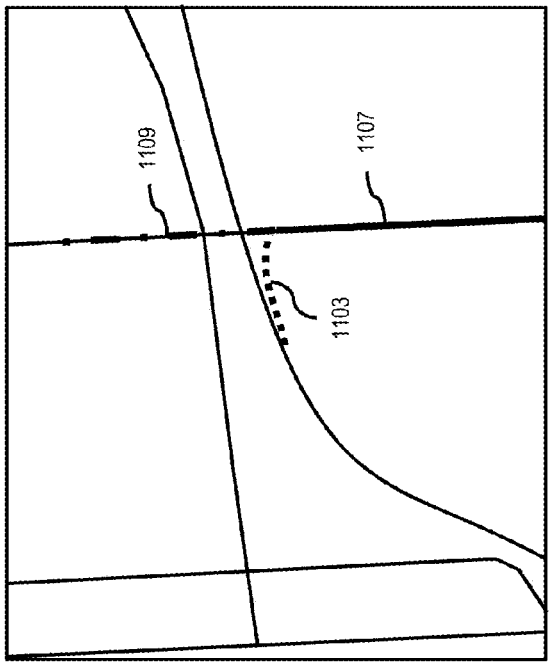
FIGS. 11A-11D are maps and charts of deriving microscopic OD from probe data, according to one embodiment.
Figure 11A:
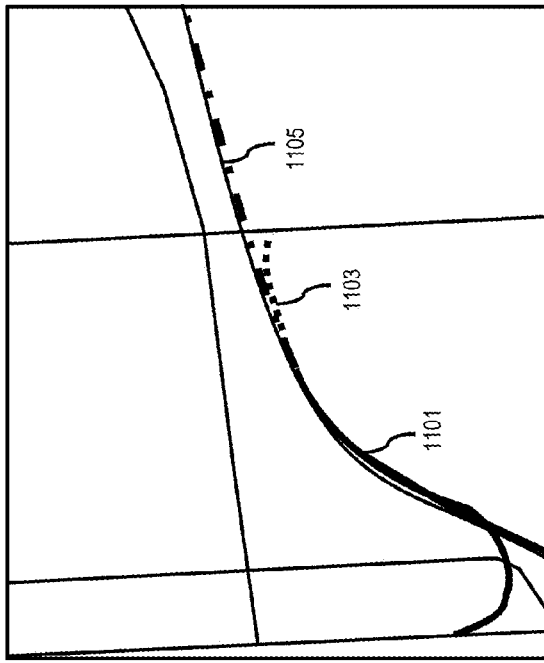
Figure 11D:
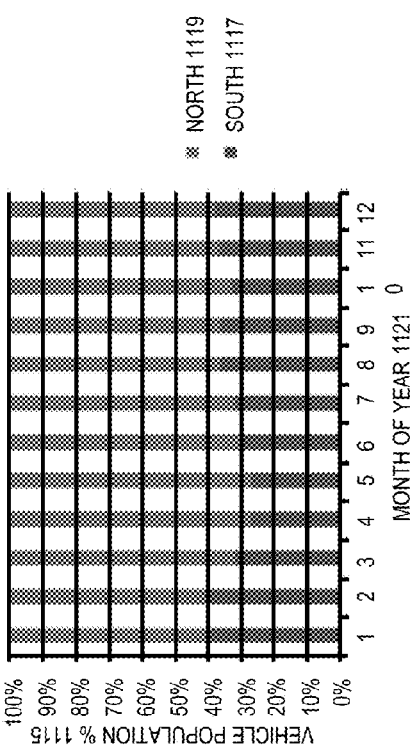
Figure 11C:
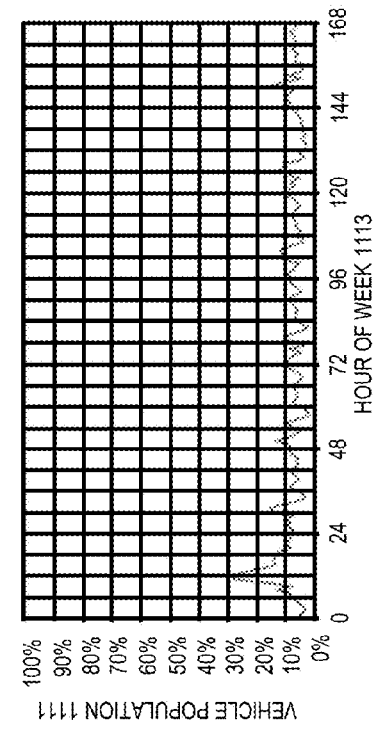

This data can be further built to investigate vehicle population movement by turn-of-day and day-of-week, per FIGS. 11C-11D.

Given several of the microscopic OD-matrices as obtained from raw probe trajectory data, an algorithm that generates a citywide deterministic OD-matrix ($OD_{ij}(t)$) and a probabilistic OD-Matrix ($OD'_{ij}(t)$) for the entire network may be formulated. This is done by propagating travel demands from one farther away origin to a destination based on the distribution of traffic density on the links en-route.

$$G_{ij}(t) = w(d, tt, k) \quad (1)$$

$$OD_{ij}(t) = w(tt, k) \quad (2)$$

Equation (1) is the time-dependent transportation network graph. The graph has an adjacent weight matrix that contains a composite weight of d is the length of arc (ij), tt=average travel time to move from node i to j, k=probe-path count and t is the instantaneous time t or epoch. See FIGS. 11C-11D for a sample. Equation (2) is the weighted matrix that captures all the microscopic OD-matrices derived from several probe trajectories with a value of tt is the average travel time of all probe-paths between origin node i to destination node j and k is the probe-path count. See FIGS. 12A-12B for a sample.

Figure 13A:
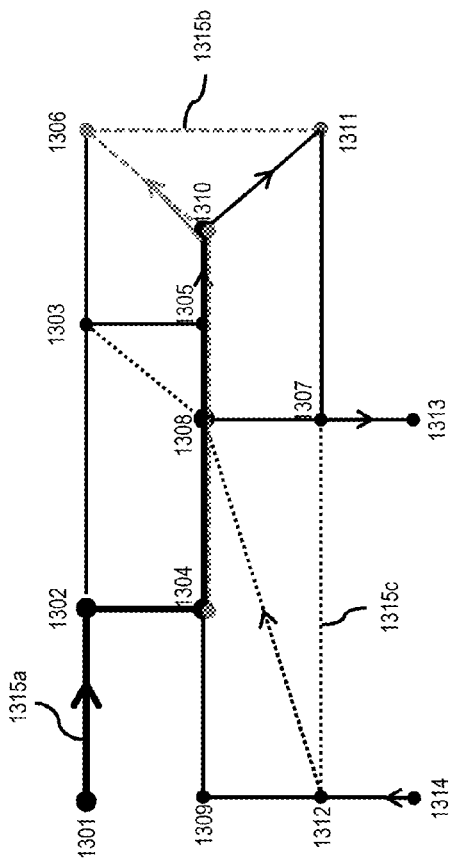

Assuming three probe-paths traverses the network of FIG. 13A, the matrix table in FIG. 13B captures all the microscopic OD-matrices and for example, shows that there was a probe trajectory 1315a that had a journey from node 1304 to node 1305 and there is another probe trajectory 1315b that had a journey from node 1304 to 1305. The resultant OD-matrix value for $OD_{1304,1305}=1+1=2$. This is how the deterministic OD-matrix is built for the entire network. The next concern is how can gaps for the [?] boxes get filled, using only the short-length of probe trajectory data? Thus, a new non-deterministic but stochastic OD-matrix ($OD'_{ij}(t)$) for the network is defined as $$OD'_{ij}(t) = w\left(\frac{\sum_{r=1}^{n} KSP_{ij}(t, tt_r)}{n}, \sum_{r=1}^{n} KSP_{ij}(t, k_r)\right) \quad (3)$$

Where KSP is the K-shortest path algorithm on graph and r represents each route(s) and/or path(s) generated by K-shortest path. K-shortest path is an algorithm that finds not just the shortest path from origin to destination but all other possible paths, such that paths can be ranked) from the shortest to the farthest in a network graph. $KSP_{ij}(t,k_r)$ in equation 3 takes a route r and computes an estimated number of probe-paths that would arrive at node j given an amount that departed from node i as in the deterministic OD-matrix OD in equation (2)/FIGS. 13A-13B, while $KSP_{ij}(t,tt_r)$ estimates the travel time (total journey) time it would take to move from origin node i via a particular route r to a destination node j. In one embodiment, it is recommended that n=3 for a start. Thus, only the top three shortest paths can be used. Given a time interval of three hours, eight time epochs may be created in twenty-four hours. Therefore eight of these matrices and graphs would be generated accordingly: $G_{ij}(1), G_{ij}(2), \ldots, G_{ij}(3), OD_{ij}(1), OD_{ij}(2), \ldots, OD_{ij}(8)$ and $OD'_{ij}(1), OD'_{ij}(2), \ldots, OD'_{ij}(8)$.

Once these matrices are generated for a city transportation network using probe trajectory from a UE 101, DTA analysis may be performed at any given time. For example, a use case question like: if a road construction needs to be performed on a particular road segment ij at a particular time t, what road segments would this impact and where could congestion and/or traffic jams emanate? The shortest-path algorithm may be used to find and/or see the re-routing strategies probe trajectories would have to make when the road is closed for repairs. Thus, having an idea of the destination where most of the probes on that road segment go helps in determining this re-routing strategy. Both the deterministic and the stochastic OD-matrices of the entire network may be used for this purpose.

Figure 2:
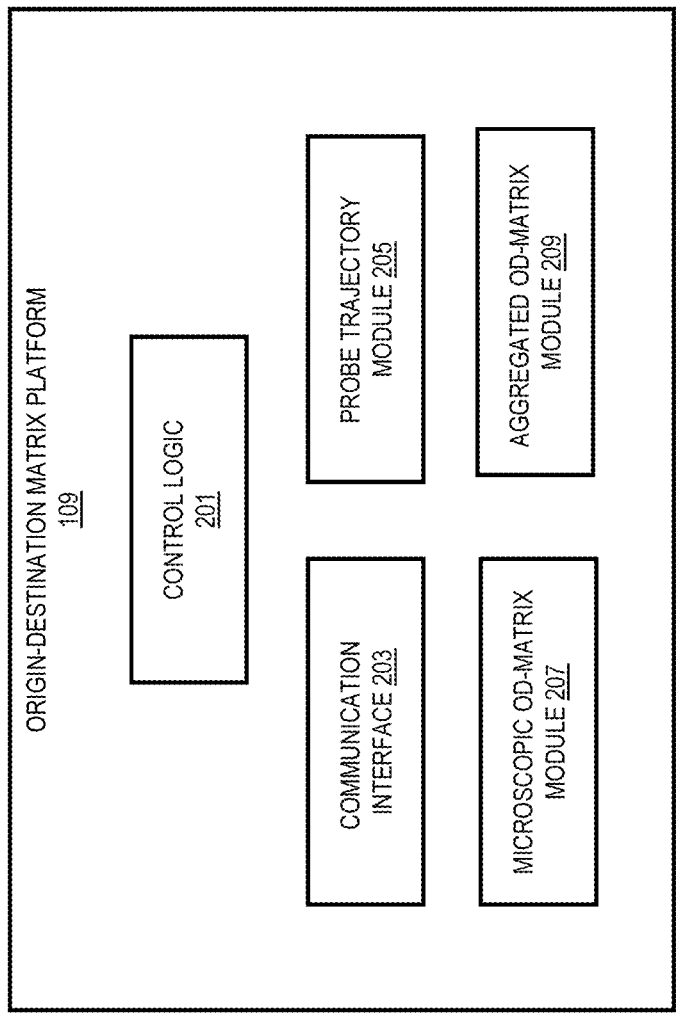
FIG. 2 is a diagram of the components of an OD-matrix platform, according to one embodiment.

FIG. 2 is a diagram of the components of an OD-matrix platform, according to one embodiment. By way of example, the OD-matrix platform 109 includes one or more components for providing an origin-destination matrix using probe trajectory data. It is contemplated that the functions of these components may be combined in one or more components or performed by other components of equivalent functionality. In this embodiment, the OD-matrix platform 109 includes a control logic (or processor) 201, a communication interface 203, a probe trajectory module 205, a microscopic OD-matrix module 207, and an aggregated OD-matrix module 209.

The control logic 201 executes at least one algorithm, software, application, and the like for executing functions of the OD-matrix platform 109. The control logic 201 may also utilize the communication interface 203 to communicate with other components of the OD-matrix platform 109, the UEs 101, the services platform 113, the content provider 117, and other components of the system 100. For example, the communication interface 203 may transmit a notification to a user's device to indicate whether the user request has been registered with one or more service providers. The communication interface 203 may further include multiple means of communication. In one use case, the communication interface 203 may be able to communicate over near field communication, SMS, internet protocol, instant messaging, voice sessions (e.g., via a phone network), or other types of communication.

The probe trajectory module 205 receives probe trajectory data from the various sensors 107 and the UEs 101 and associates this probe trajectory data with at least one subset of a plurality of travel nodes. For example, the probe trajectory module 205 may receive probability data for a travel node with respect to the probability of the paths most often taken by vehicles traveling through the travel node. In one embodiment, without having access to final original-destination information, the probe trajectory module 205 may utilize the data received about a travel node and use this data to calculate the probability of maneuver at the node. Further, the probe trajectory data may repeat the above process of calculating probability data at a travel node for each node within a designated area, such as a downtown metropolis, a city network, a county network, or any number of roadway system or transportation network containing intersecting nodes, etc. In another embodiment, the probe trajectory module 205 may calculate the probability of travel for a series of nodes or probe trajectory. For example, the probe trajectory module 205 may calculate the probability of traffic flow for five adjacent travel nodes.

The microscopic OD-matrix module 207 utilizes the probe trajectory data to construct microscopic OD-matrices. In one embodiment, the OD-matrix module 207 may utilize the same probe trajectory data used by the probe trajectory module 205 to create microscopic OD-matrices. In another embodiment, the OD-matrix module 207 may utilize the traffic flow calculations at a particular node or set of nodes as determined by the probe trajectory module 205 in order to create microscopic OD-matrices. In yet another embodiment, the OD-matrix module 207 may use a combination of the probe trajectory data and the calculations provided by the probe trajectory module 205 to create the OD-matrices. The OD-matrix module 207 may associate traffic density with the microscopic OD-matrices it creates. In one embodiment, the microscopic OD-matrices may be associated with paths with varying lengths, wherein the lengths of the probe trajectory paths may vary based on, for example, map data.

The aggregated OD-matrix module 209 aggregates the microscopic OD-matrices created by the microscopic OD-matrix module 207 to construct an aggregated OD-matrix to represent maneuver probability at the travel nodes for the larger network. In one embodiment, the aggregated OD-matrix module 209 calculates a sum of the one or more microscopic probe trajectories that traversed each of the nodes to determine a resultant matrix value for each of the nodes. In one embodiment, the aggregated OD-matrix module 209 aggregates the microscopic matrix with a deterministic matrix to create a stochastic matrix. For example, a deterministic matrix created from probe trajectory data is likely to have missing values because, for example, the probe trajectory data may have been anonymized so that the OD of the trajectory may be unknown. In another example, probe trajectory data for the nodes corresponding to the missing values may simply be unavailable as no data had been collected for those locations. To account for the missing value, the OD-matrix may utilize a stochastic matrix algorithm from the microscopic path trajectories, average travel time of the microscopic path trajectories, and the microscopic path count.

In one embodiment the aggregated OD-matrix module 209 may utilize a K-shortest path equation with the stochastic algorithm to determine the shortest path between an OD. Further, the aggregated OD-matrix module 209 may sort the results provided from the algorithm by the length of the path and limit the paths to reflect a present number (e.g., top two shortest paths) of the shortest paths to be considered.

Figure 3:
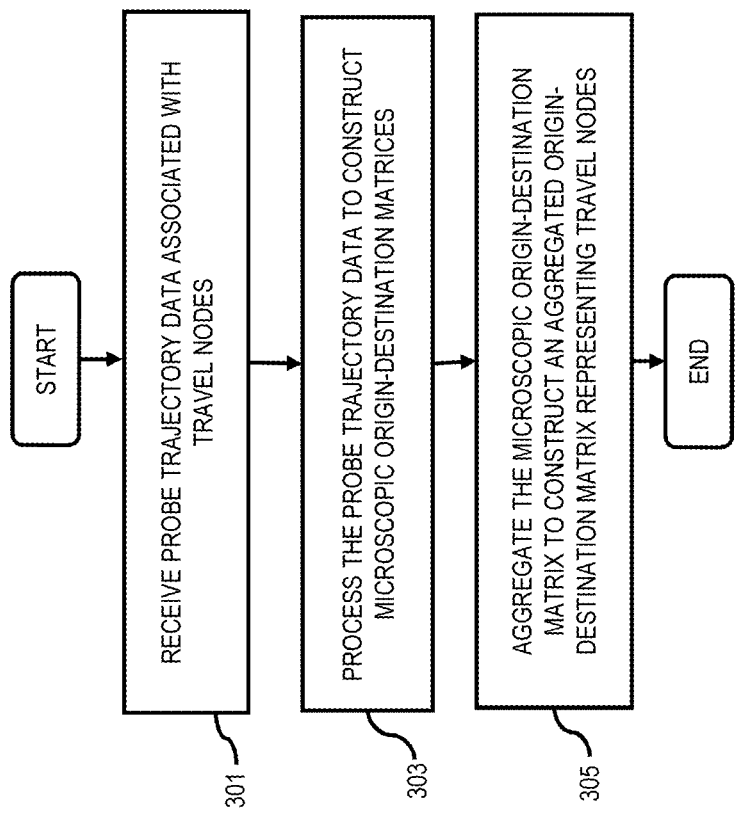
FIG. 3 is a flowchart of a process for providing an origin-destination matrix using probe trajectory data, according to one embodiment.
Figure 15:
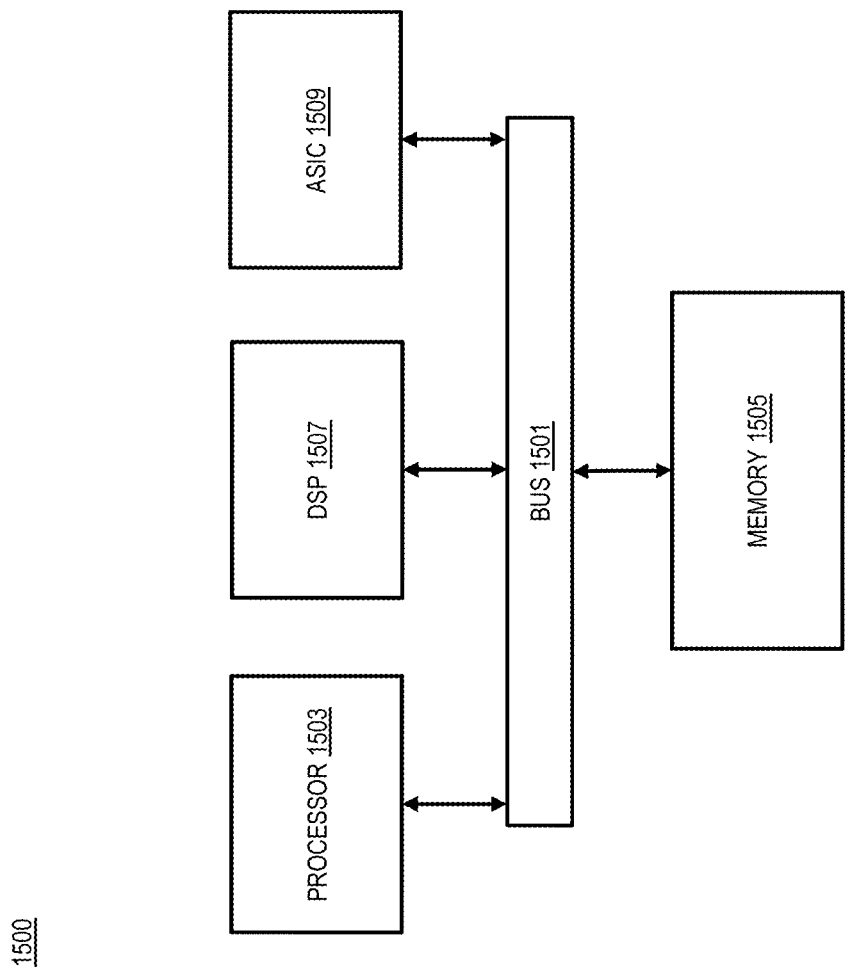
FIG. 15 is a diagram of a chip set that can be used to implement an embodiment of the invention.

FIG. 3 is a flowchart of a process for providing an origin-destination matrix using probe trajectory data, according to one embodiment. In one embodiment, the OD-matrix platform 109 performs the process 300 and is implemented in, for instance, a chip set including a processor and a memory as shown in FIG. 15.

In step 301, the OD-matrix platform 109 receives probe trajectory data, wherein the probe trajectory data is associated with at least one subset of a plurality of travel nodes. Probe trajectory data may encompass, for example, data collected from GPS associated with vehicles, phones or any associated location tracking technology. Probe trajectory data may also encompass mined historical archive data collected over time from various sources including, but not limited to, GPS data. Further, probe trajectory data does not require information regarding the user's OD locations in order to be useful to the OD-matrix platform 109. In one embodiment, probe trajectory data may also be collected from cellular towers triangulation and Bluetooth devices in addition to or in combination with GPS devices. In one embodiment, probe trajectory data may encompass camera data and survey data. Additionally, probe trajectory data can be any data processing trajectory data, including future technologies.

Travel nodes may encompass a roadway intersection, freeway off-ramp, T-stop, road divisions, or any other section of road which may require a driver to decide from at least two options of travel. A plurality of travel nodes may encompass adjacent travel nodes wherein the traveler may make a decision at each successive node. From this information, the OD-matrix platform 109 may begin to determine the probability of maneuver at each decision point as well as the volume of traffic traversing those decision points and create sequential links of traffic flow and information.

In step 303, the OD-matrix platform 109 processes and/or facilitates a processing of the probe trajectory data to construct one or more microscopic origin-destination matrices, wherein the at least one microscopic origin-destination matrix represents one or more preferred travel paths through the subset of the plurality of travel nodes. In one embodiment, from the information collected from the probe trajectory, the OD-matrix platform 109 may begin to determine the probability of maneuver at each decision point as well as the volume of traffic traversing those decision points. That is, the OD-matrix platform 109 may begin to take small sections of a larger map, for example, probe trajectory data for a set of five square blocks in a city map. The OD-matrix platform 109 may use the data from the five by five square blocks to create an OD-matrix which reflects the probability at each decision point (or travel node) and traffic density throughout the five by five square blocks. Hence, these smaller OD-matrices which reflect a smaller subsection of a section (e.g., the five by five city blocks) may contain enough sequential links of travel nodes to create a microscopic OD-matrix.

In step 305, the OD-matrix platform 109 causes, at least in part, an aggregation of the one or more microscopic origin-destination matrices to construct at least one aggregated origin-destination matrix to represent the plurality of travel nodes, wherein the one or more microscopic origin-destination matrices, the at least one aggregated origin-destination matrix, or a combination thereof include, at least in part, one or more deterministic matrices, one or more stochastic matrices, or a combination thereof. In one embodiment, the sequential links used to create microscopic OD-matrices may eventually be aggregated to create an OD-matrix which is capable of representing a macrocosm of the microscopic OD-matrices. Continuing with the above example, the microscopic OD-matrix created to represent the five by five square blocks may be one of several such microscopic OD-matrices of varying collections of city blocks which may be aggregated into an OD-matrix capable of accounting for probabilistic determinations and traffic density at travel nodes throughout an entire city when aggregated into a single, larger, OD-matrix. Further, the OD-matrix created from the microscopic OD-matrices may be deterministic, stochastic, or a combination, depending on the probe trajectory data available to create the matrix.

Figure 4:
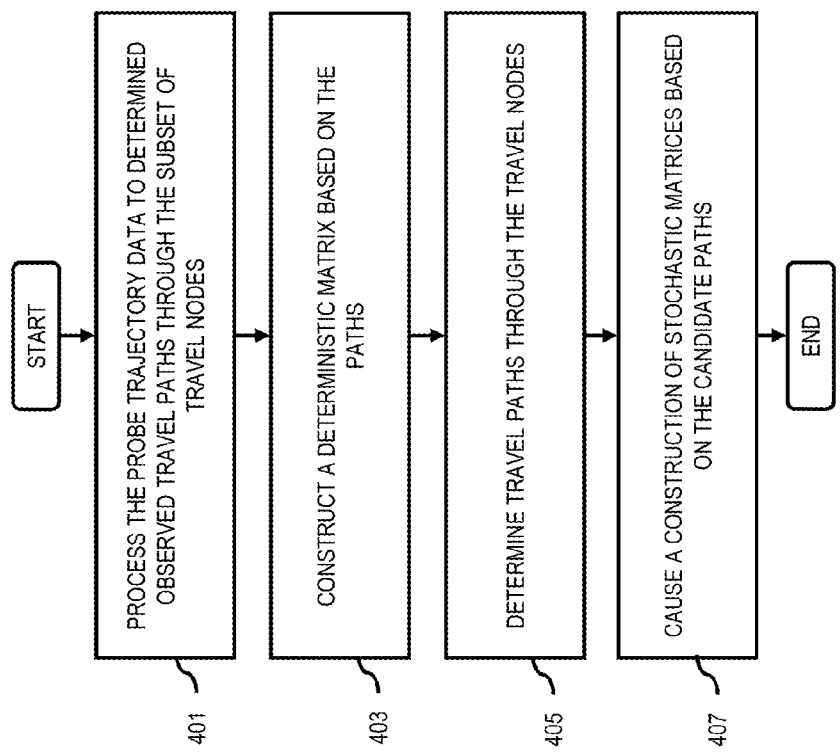
FIG. 4 is a flowchart of a process for providing deterministic and stochastic matrices based on probe trajectory data, according to one embodiment.

FIG. 4 is a flowchart of a process for providing deterministic and stochastic matrices based on probe trajectory data, according to one embodiment. In one embodiment, the OD-matrix platform 109 performs the process 400 and is implemented in, for instance, a chip set including a processor and a memory as shown in FIG. 15.

In step 401, the OD-matrix platform 109 processes and/or facilitates a processing of the probe trajectory data to determine one or more observed travel paths through the subset of the plurality of travel nodes. The probe trajectory data allows extrapolations of sequential links from the identification of turning movement of vehicles at interceptions, thereby revealing the most popular and preferred routes for any number of ODs within a city. For example, the probe trajectory data may reveal the turning probabilities for a three by three square city block and finds that vehicles turn left in the middle intersection sixty-three percent of the time. Accordingly, similar turning probabilities are charted for each adjacent intersection such that the most preferred or popular routes may be revealed based on such numbers. In an example embodiment, this information may be used to determine how road repairs should be scheduled as to be least disruptive to current traffic flow.

In step 403, the OD-matrix platform 109 causes, at least in part, a construction of the one or more deterministic matrices based, at least in part, on the one or more observed paths. The probe trajectory data may be used to propagate travel demands of greater distance between the origin and destination based on the traffic density of the intersections within the route. Continuing with the above example, the three by three city map grid may be expanded to a twelve by twelve city map grid provided there is sufficient probe trajectory data to account for the traffic density and turning probabilities for each intersection within the grid. The deterministic matrix algorithm takes into account the average travel time of all of the probe trajectories between the distance between the origin and destination and the candidate path count. The deterministic OD-matrix values are the sum of the number of probe trajectories which have journeyed through the intersections on the matrix. In one embodiment, the deterministic OD-matrix may be used to determine the ideal placement of new road constructions.

In step 405, the OD-matrix platform 109 determines one or more candidate travel paths through the plurality of travel nodes, wherein the one or more candidate travel paths are not observed in the probe trajectory data. Continuing with the above example, arbitrary origins and destinations may be selected within the twelve by twelve city map grid and a popular or preferred route may be determined based on the traffic density and turning probabilities for each intersection within the grid. Additionally, this popular or preferred route was not observed from the probe trajectory data. Instead, this popular or preferred route was determined from the deterministic OD-matrix. As such, routes within the twelve by twelve grid are not limited solely to the routes from the probe trajectory data, but a nearly limitless number of routes may be derived from the deterministic OD-matrix. In one embodiment, the deterministic OD-matrix may aid roadway capacity management.

In step 407, the OD-matrix platform 109 causes, at least in part, a construction of the one or more stochastic matrices based, at least in part, on the one or more candidate paths. Continuing with the above example, in a situation where some of the intersections of the twelve by twelve city block is missing probe trajectory data, the OD-matrix platform 109 may still determine the corresponding matrix values for such intersections by utilizing a stochastic OD-matrix algorithm. The stochastic OD-matrix algorithm considers a K-shortest path algorithm (see steps 501-505), the estimated number of candidate paths that can arrive at a destination as determined by the deterministic OD-matrix, while also accounting for total travel time for a candidate travel path from origin to destination. In one embodiment, the stochastic OD-matrix may aid in, for example, roadway capacity management, traffic visualization, and traffic forecasting.

Figure 5:
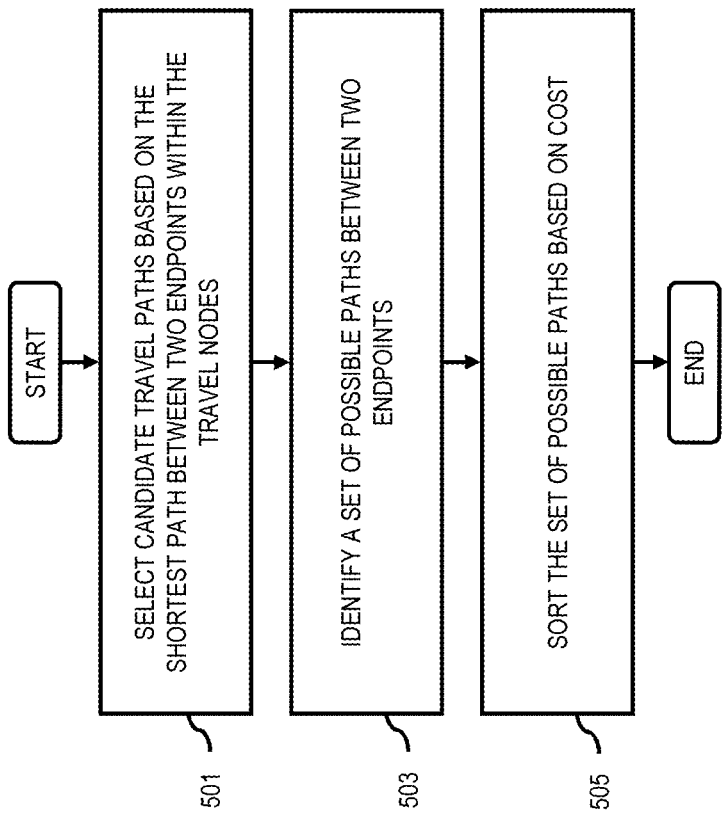
FIG. 5 is a flowchart of a process for the K-shortest path algorithm, according to one embodiment.

FIG. 5 is a flowchart of a process for the K-shortest path algorithm, according to one embodiment. In one embodiment, the OD-matrix platform 109 performs the process 500 and is implemented in, for instance, a chip set including a processor and a memory as shown in FIG. 15.

In step 501, the OD-matrix platform 109 causes, at least in part, a selection of the one or more candidate travel paths based, at least in part, on at least one shortest path between at least one originating endpoint node and at least one terminating endpoint node within the plurality of travel nodes. For example, the number of candidate travel paths that an OD-matrix may identify can be numerous. As such, sorting of the candidate travel paths may be a useful function to identify an idealistic candidate path for a user request. In one embodiment, the candidate path sort may be based on the distance of the candidate path. That is, the candidate path may be sorted based on the shortest distance between the beginning and ending locations. In another embodiment, the sort may be based on the shortest travel time of a candidate path. In one embodiment, the selection of the shortest candidate path may be used in routing and navigating applications.

In step 503, the OD-matrix platform 109 causes, at least in part, an identification of a set of possible paths between the at least one originating endpoint node and the at least one terminating endpoint node. The OD-matrix may receive desired origin (e.g., beginning or current locations) and destination locations and in response, the OD-matrix may compile every possible path between the OD that was entered. In another embodiment, this identification may be between the current location and the ending location. In another embodiment, the identification may be between the current location and one intermediary location or destination. The number in the set of possible paths may vary from zero to hundreds and maybe even thousands depending on the layout of the map and the distance. The set of possible paths may have the OD in common. In one embodiment, this step may be useful in an incident management scenario wherein one or more intersections and/or segments within a network may be unavailable or closed and city planners must identify a detour for drivers.

In step 505, the OD-matrix platform 109 causes, at least in part, a sorting of the set of possible paths based, at least in part, on length, wherein the one or more candidate travel paths include, at least in part, a predetermined number of the set of possible paths with a shortest length. That is, the candidate path may be sorted based on the route with the shortest length and/or cost between the beginning and ending locations. In another embodiment, the sort may be based on the shortest travel time of a candidate path. In another embodiment, the sort may be based on a combination of both shortest combined travel length, cost and/or travel time. In another embodiment, the sort may be based on the shortest travel length and/or cost when accounting for current traffic conditions or road closures. In another embodiment, the sort may be based on shortest length and/or cost and fewest speeding cameras and/or intersection cameras.

Figure 6:
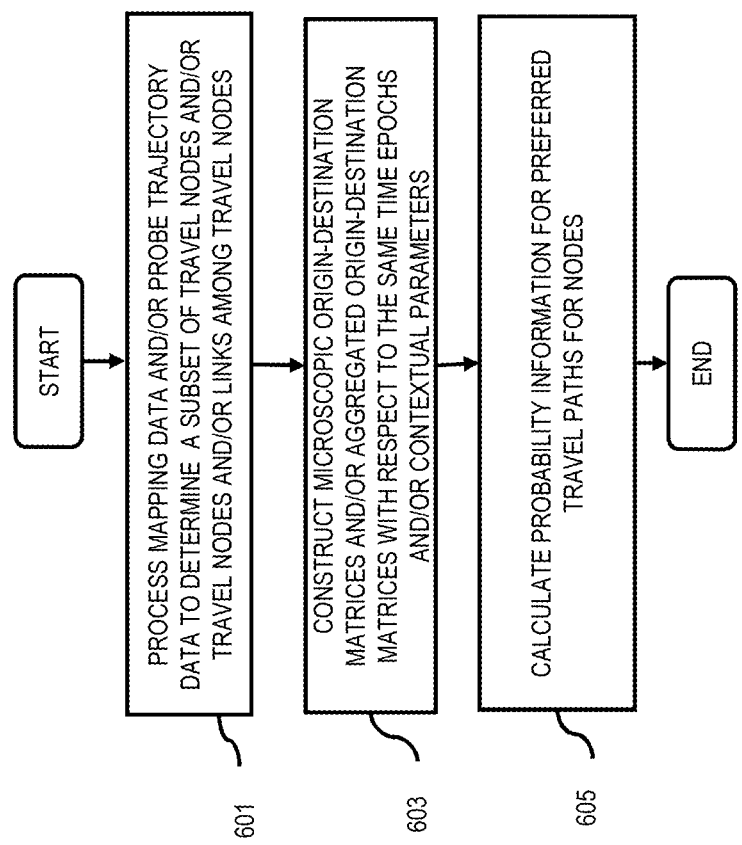
FIG. 6 is a flowchart of a process for using mapping data to construct a matrix that may calculate probability information for preferred travel paths for nodes, according to one embodiment.

FIG. 6 is a flowchart of a process for using mapping data to construct a matrix that may calculate probability information for preferred travel paths for nodes, according to one embodiment. In one embodiment, the OD-matrix platform 109 performs the process 600 and is implemented in, for instance, a chip set including a processor and a memory as shown in FIG. 15.

In step 601, the OD-matrix platform 109 processes and/or facilitates a processing of mapping data, the probe trajectory data, or a combination thereof to determine the at least one subset of the plurality of travel nodes, the plurality of travel nodes, one or more links among the plurality of travel nodes, or a combination thereof. Mapping data may contain geographic information about a roadway network which can include roadways, intersections, elevation information, longitude and latitude coordinates, historical sites, city zoning information, bodies of water, etc. When this mapping data is combined with the probe trajectory data, which can provide traffic density and maneuvering probability, travel nodes or subsets of travels nodes, and links between travel nodes may be observed. For example, a travel node may be a decision point in a route. A travel node may encompass an intersection, a freeway off-ramp, a T-stop, etc. A subset of travel nodes may be series of connected travel nodes. In one embodiment, a subset of travel nodes may be a combination of travel nodes often traveled upon in succession. The links among the plurality of travel nodes may be roadways linking the travel nodes. In one embodiment, a travel node may be a train station and the links which are connected by the train station may comprise of both a highway (for cars traveling to the train station) and the train tracks connecting this train station to the next one (for passengers aboard the train after parking their cars).

In step 603, the OD-matrix platform 109 causes, at least in part, a construction of the one or more microscopic origin-destination matrices, the at least one aggregated origin-destination matrix, or a combination thereof with respect to one or more time epochs, one or more contextual parameters, or a combination thereof. A microscopic OD-matrix is an OD-matrix created from probe path trajectories wherein the OD's of these trajectories may be unknown. The microscopic OD-matrix may reflect smaller sections of a map as allowed for by the anonymized probe path trajectories. On the other hand, an aggregated OD-matrix may account for a larger area on a map as it aggregates the probe trajectory data from multiple microscopic OD-matrices. When the OD-matrix platform 109 constructs either microscopic OD-matrices or OD-matrices, the OD-matrix platform 109 may create these OD-matrices based on preset time epochs (e.g., every 8 hours, every 2 hours, etc.) and/or contextual parameters. Contextual parameters may include average time required to travel between the OD, the distance between the OD, probe-path count, average time of all the probe-paths for a given OD, etc.

In step 605, the OD-matrix platform 109 causes, at least in part, a calculation of probability information for the one or more preferred travel paths for respective one or more nodes of the plurality of nodes, wherein the probe trajectory data include, at least in part, satellite-based location probe data. Probability information may include traffic densities at different times of the day, maneuver probability, speed at the node or intersection, seasonal weather conditions, motorcycles, delivery trucks, etc. The probability information may be derived from the probe trajectory data directly, or the probability information may also be an extrapolated product of the probe trajectory data or derived from an algorithm. Additionally, this probability information may be used to determine preferred travel paths throughout a series of nodes based on user preferences like shortest distance, shortest time, etc. In one embodiment, probe trajectory data may include satellite-based location probe data.

Figure 7:
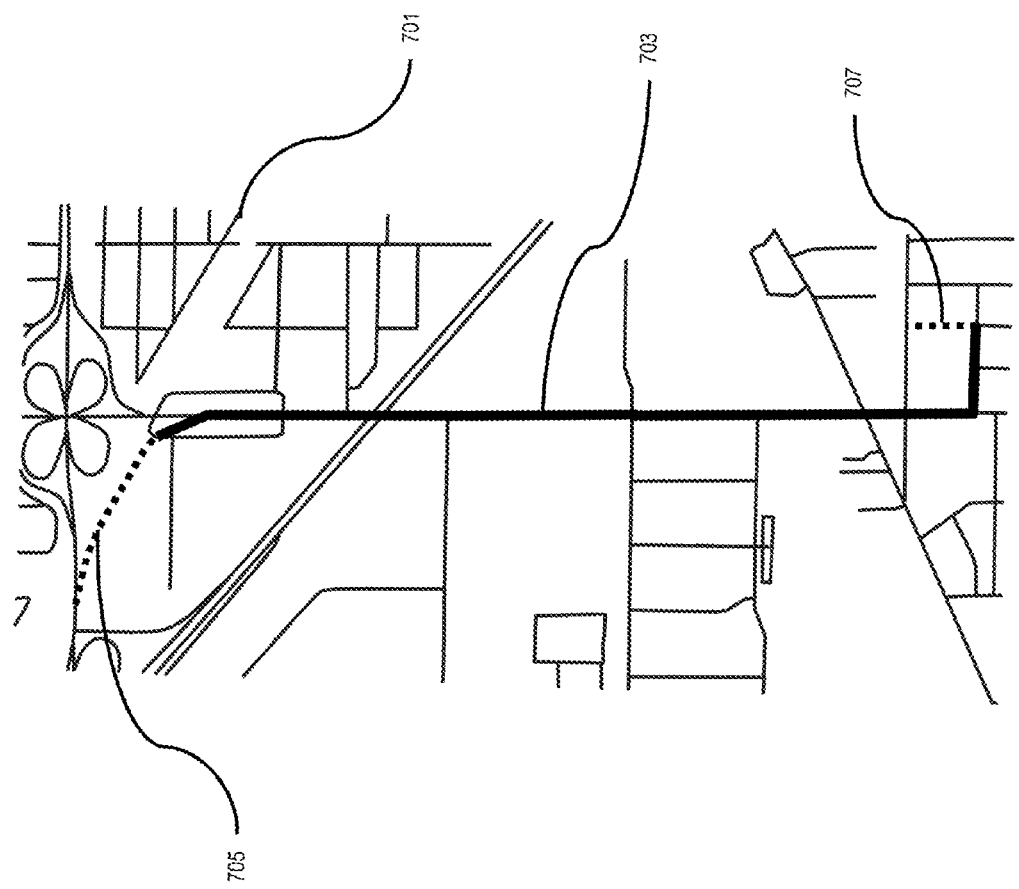
FIG. 7 is a diagram of a typical probe trajectory from origin to destination, according to one embodiment.

FIG. 7 is a diagram of a typical probe trajectory from origin to destination, according to various embodiments. Map 701 contains an example probe trajectory path 703 wherein the probe trajectory path is denoted by the thicker path line. Broken line 705 represents the "origin" of probe trajectory 703, while broken line 707 represents the "destination" of the probe trajectory 703. The broken lines at the origin 705 and destination 707 denote the anonymization of the probe trajectory 703, as the actual origin and destination of probe trajectory 703 are unknown. As shown, the precise origin 705 and destination 707 are unknown; however, the probe trajectory 703 provides data regarding how the driver has maneuvered at each travel nodes 709-717. For example, at travel node 709, the driver merged onto a main road. At travel node 711, the driver continued straight. Further, at travel node 713 and 715, the driver continues straight across the travel nodes to stay on this main road. It is not until the driver reaches travel node 717 that the driver turns left. From this set of maneuvering decisions, the OD-matrix platform 109 may create microscopic origin-destination matrices. After the OD-matrix platform 109 aggregates several of these probe trajectories 703, the OD-matrix platform 109 may have the data to determine the probability of maneuvering at each of the travel nodes 709-717.

Figure 8:
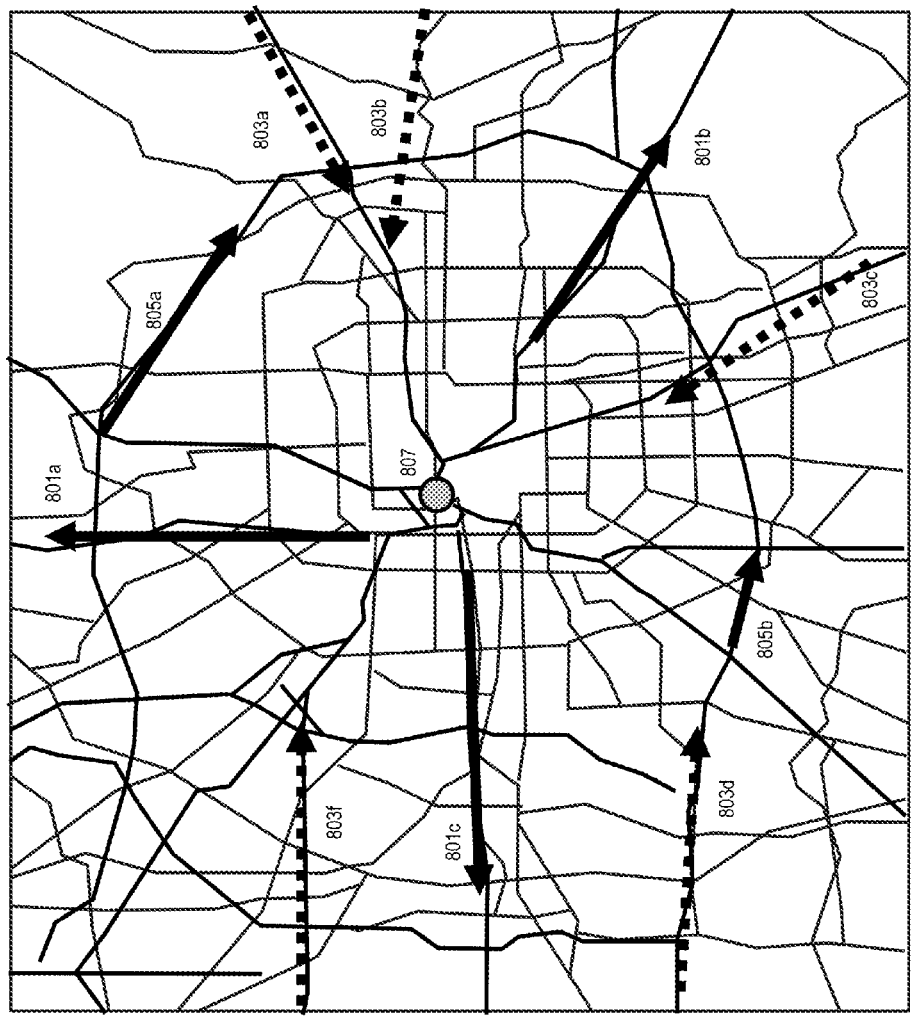
FIG. 8 is a diagram of traffic demands into and out of a city, according to one embodiment.

FIG. 8 is a diagram of traffic demands into and out of a city, according to various embodiments. Map 800 contains an example embodiment of tracking traffic demands. The map 800 is created from aggregating the data collected from probe trajectories, much like the probe trajectory 703. For example, by aggregating probe trajectory data, the OD-matrix platform 109 may determine and display the arrows 801a-803c indicating the most popular roadways by which vehicles exit the city. Arrows 803a-803f indicates all the major roadways entering the city. Both the 801 and 803 arrows may further indicate their varying levels of traffic density. For example, probe trajectory data may report that the traffic density at exit 803a is twice as dense during busy commute times as is exit 803c. As such, such information may be especially useful when city planners are determining the least disruptive times to perform road work.

The arrows 805a-805b indicates current detours with varying levels of congestion as well. Such data allows city planners to see how drivers respond to various road closures or incidents and allows city planners to preemptively respond, for example, when planning new highways, etc. Circle 807 represents the center of the city. As demonstrated, traffic demand management may be observed from a bird's eye view with varying levels of traffic flow available at multiple points of the roadway network. As such, use cases may include roadway capacity management, scheduling of road repairs, new road construction, incident management, roadway capacity modeling, traffic visualization, traffic forecasting, routing and navigation, etc.

Figure 9B:
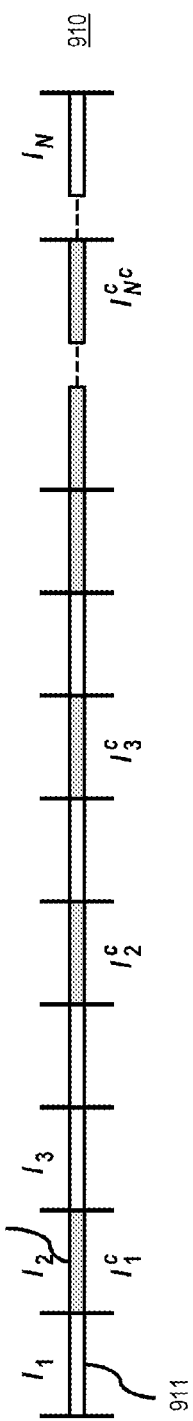

FIGS. 9A-9B are diagrams of a sample transportation network and a probe trajectory with sequential links, according to one embodiment. As shown, the transportation network 900 in FIG. 9A has several possible routes a vehicle can take from origin node 901 to destination node 903. Each probe trajectory may be a set of sequential links traversed by a driver enroute from origin node 901 to destination node 903. In most cases, most drivers may opt for the route with the shortest distance between node 901 and 903. Depending on various mapping data, the preferred route may vary. Additionally, a preferred alternate route may also vary based on the map data when there are road closures, accidents, etc. For the OD-matrix platform 109, each travel node represents a decision point and opportunity for discovering data regarding vehicle maneuvering probability. As a driver proceeds at each travel node, the driver provides another data point regarding the maneuvering probability at that travel node. After the OD-matrix platform 109 collects probe trajectory data for each travel node for hours, days, weeks, months, or even years, the OD-matrix platform 109 can provide quantitative output regarding the maneuvering probability at each travel node.

FIG. 9B is a general representation and labeling of a probe trajectory travel path 910 with a subset of congested links or speed profile for all links. In other words, FIG. 9B provides an example embodiment of the type of data that can be determined from probe trajectories. After the OD-matrix platform 109 collects enough data points from the travel nodes in FIG. 9A for a period of time, the OD-matrix platform 109 may monitor trends in traffic density at different links in the travel path. For example, the links without a fill color, like link 911, represents an uncongested link whereas the link with a light gray fill color, like 913, represents a traffic congested link. As such, an observer may quickly identify which links are congested and/or quickly determine a speed profile at each link or when during his travel he can expect to face the most traffic.

FIGS. 10A-10B are diagrams of a microscopic OD-matrix, according to one embodiment. Probe path 1001 is a probe path like probe path 910, wherein probe path 1001 represents a series of sequential links. From each probe path in the probe path 1001, a microscopic probe path 1003 may be extracted. Each of these microscopic probe paths 1003 may correspond to the probe trajectory like probe trajectory 703. After several microscopic probe paths 1003 have been extracted, these microscopic probe paths 1003 may be aggregated to create a probe path 1005. The probe path 1005 represents the general trends in traffic density and maneuvering probability for respective travel nodes based on the aggregated probe trajectories represented by the microscopic probe paths 1003. Additionally, each microscopic probe path 1003 allows for a value to be entered in the microscopic OD-matrix box 1010 in FIG. 10B. The 7-links by 7-links microscopic matrix box 1010 corresponds to the seven links in the probe path 1001 and contains the count of the total number of routes and/or paths that a vehicle took from the row-link (upstream) 1011 to the column-link (downstream) 1013. Therefore, even though the ultimate origin and destinations of the microscopic probe paths may have be unknown, the OD-matrix platform 109 may still make use of the information provided regarding each sequential link, at least as these sequential links relate to adjacent links such that the accumulation of the relationships between such successive links may provide data on maneuvering probability and traffic density.

FIGS. 11A-11D are maps and charts of deriving microscopic OD from probe data, according to one embodiment. In FIG. 11A, route 1101 represents a roadway origin from where a vehicle may either exit the highway off-ramp 1103 or continue on the highway 1105. The highway off-ramp represents an example decision point for a driver, and is thus a travel node for which the OD-matrix platform 109 may collect data points via probe trajectories. Probe trajectory data can provide the probability of a vehicle exiting through the off-ramp 1103 or continuing on the highway 1105. Over time, this data may provide a database of maneuvering probabilities at the respective travel node, or the percentage of passing vehicles that exit with that freeway off-ramp. Additionally, the number of such vehicles exiting the off-ramp may also be collected to reflect the density of traffic at the off-ramp. In fact, FIG. 11C displays the percentage of unique vehicles continuing on the highway (1111) from FIG. 11A at different times of the day (1113).

FIG. 11B may be the next travel node after FIG. 11A from which a vehicle which has exited the off-ramp 1103 may either chose to head south onto roadway 1107 or north onto roadway 1109. As such, the first intersection after the freeway exit ramp represents another travel node from which probe trajectory data may be collected. Again, probe trajectory data can illuminate the percentage of drivers exiting the off-ramp 1103 to head south onto roadway 1107 versus the percentage of drivers who head north onto roadway 1109. FIG. 11D displays the percentage of unique vehicles (1115) heading south (1117) versus north (1119) based on the time of the year (1121). In one embodiment, the travel nodes from FIG. 11A and FIG. 11B may represent two sequential links in a probe path. The OD-matrix platform 109 may consider both sets of data collected at these sequential travel nodes to determine overall probabilistic maneuvering and traffic density for each travel node, and for both probe paths as a sequential link.

Figures 12A, 12B:
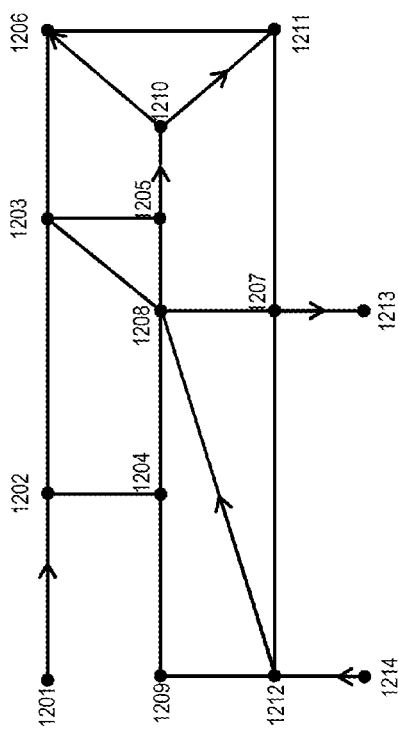
FIGS. 12A-12B are diagrams for a downstream weight matrix for a time-dependent transportation network graph, according to one embodiment.

FIGS. 12A-12B are diagrams for a downstream weight matrix for a time-dependent transportation network graph, according to one embodiment. FIG. 12A represents a transportation network graph or network of travel nodes 1201-1214. Each of the travel nodes 1201-1214 represents a decision point on the travel path and each link between the travel nodes 1201-1214 represents a connecting road between the two connecting nodes. In one embodiment, travel node 1202 may represent a freeway off-ramp and travel node 1203 may represent the first intersection after the freeway off-ramp. The transportation graph may be built from probe trajectory data and represent the culmination of multiple microscopic probe paths pieced together node by node to by the OD-matrix platform 109 to construct a transportation network representing a larger area. This transportation network graph may then be the basis for a corresponding matrix. FIG. 12B is a downstream matrix for $G_{ij}(t)=w(t,k)$. Each travel node 1201-1214 corresponds to each of the sections 1201-1214 across and down creating the weight matrix. The rows represent upstream movement while the columns represent downstream movement.

FIGS. 13A-13B are diagrams for a sample deterministic OD-matrix built from probe trajectory data, according to one embodiment. FIG. 13A represents a network of travel nodes with various probe trajectories traversing the network. Each of the travel nodes 1301-1314 represent a decision point on the travel path and each link between the travel nodes 1301-1314 represent a connecting road between the two connecting nodes. Probe trajectories 1315a-1315c represents different probe trajectories in the network including travel nodes 1301-1314. FIG. 13B is a downstream matrix for $OD_{ij}(t)=w(t,k)$. Each travel node 1301-1314 corresponds to each of the sections 1301-1314 across and down creating the weight matrix. The rows represent upstream movement while the columns represent downstream movement. For example, $OD_{1304,1305}$ show that probe trajectory 1315a journeyed from node 1304 to 1305 and probe trajectory 1315b also journeyed from node 1304 to 1305. The resultant OD-matrix value for $OD_{1304,1305}=1+1=2$. The rest of the matrix in FIG. 13B is built in this manner. In order to fill the gaps left in the matrix from the probe trajectory data, the following equation is used:

$$OD'_{ij}(t) = w\left(\frac{\sum_{r=1}^{n} KSP_{ij}(t, tt_r)}{n}, \sum_{r=1}^{n} KSP_{ij}(t, k_r)\right) \quad (3)$$

Where KSP is the K-shortest path algorithm on graph and r represents each route(s)/path(s) generated by K-shortest path. K-shortest path is an algorithm that finds not just the shortest path from origin to destination but all other possible paths, such that we can rank paths from the) shortest to the farthest in a network graph. $KSP_{ij}(t,k_r)$ in equation 3 takes a route r and computes an estimated number of probe-paths that would arrive at node j given an amount that departed from node i as in the deterministic OD matrix OD in equation (2)/FIG. 13A-13B, while $KSP_{ij}(t,tt_r)$ estimates the travel time (total journey) time it would take to move from origin node i via a particular route r to a destination node j.

The processes described herein for providing an origin-destination matrix using probe trajectory data may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 14:
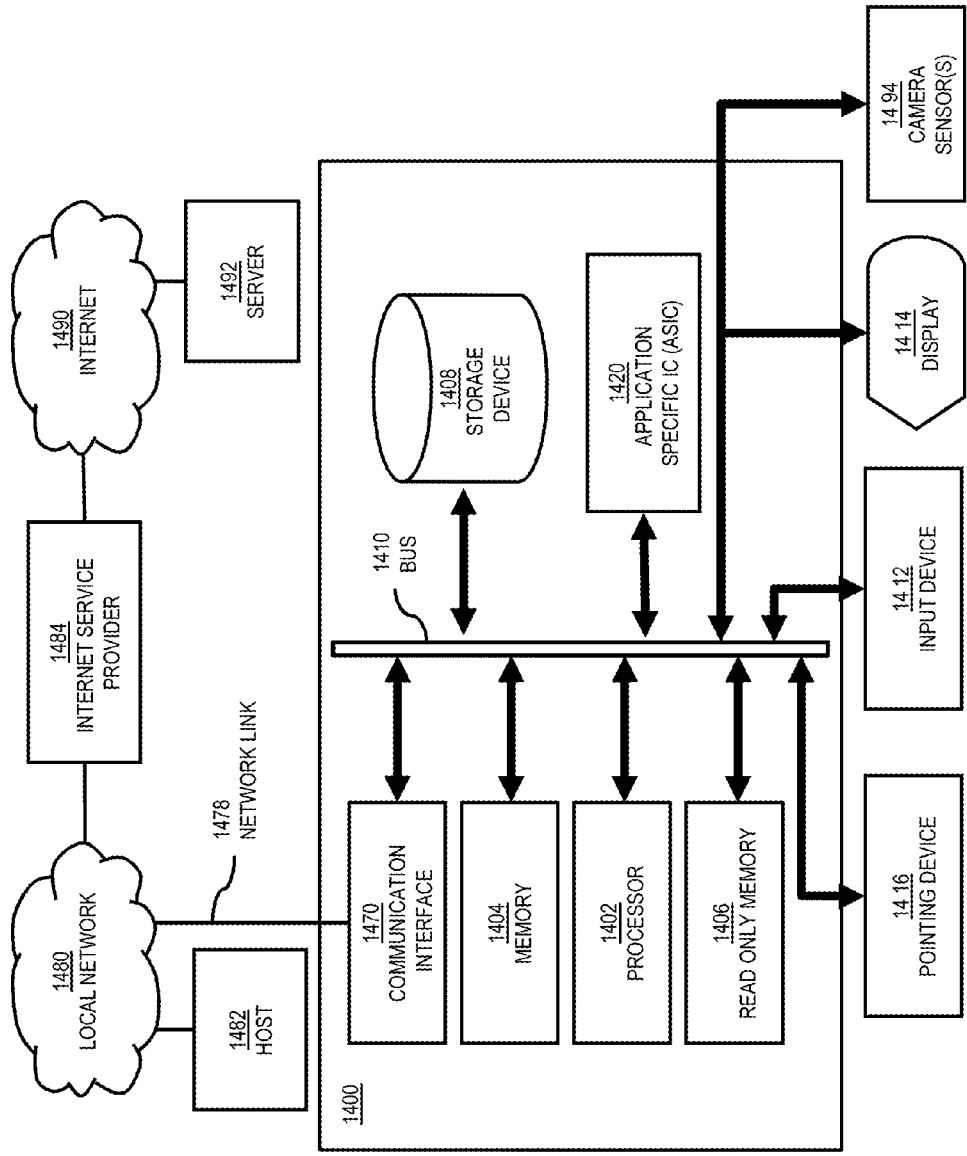
FIG. 14 is a diagram of hardware that can be used to implement an embodiment of the invention.

FIG. 14 illustrates a computer system 1400 upon which an embodiment of the invention may be implemented. Although computer system 1400 is depicted with respect to a particular device or equipment, it is contemplated that other devices or equipment (e.g., network elements, servers, etc.) within FIG. 14 can deploy the illustrated hardware and components of system 1400. Computer system 1400 is programmed (e.g., via computer program code or instructions) to providing an origin-destination matrix using probe trajectory data as described herein and includes a communication mechanism such as a bus 1410 for passing information between other internal and external components of the computer system 1400. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1400, or a portion thereof, constitutes a means for performing one or more steps of providing an origin-destination matrix using probe trajectory data.

A bus 1410 includes one or more parallel conductors of information so that information is transferred quickly among devices coupled to the bus 1410. One or more processors 1402 for processing information are coupled with the bus 1410.

A processor (or multiple processors) 1402 performs a set of operations on information as specified by computer program code related to providing an origin-destination matrix using probe trajectory data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1410 and placing information on the bus 1410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1402, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1400 also includes a memory 1404 coupled to bus 1410. The memory 1404, such as a random access memory (RAM) or any other dynamic storage device, stores information including processor instructions for providing an origin-destination matrix using probe trajectory data. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of processor instructions. The computer system 1400 also includes a read only memory (ROM) 1406 or any other static storage device coupled to the bus 1410 for storing static information, including instructions, that is not changed by the computer system 1400. Some memory is composed of volatile storage that loses the information stored thereon when power is lost. Also coupled to bus 1410 is a non-volatile (persistent) storage device 1408, such as a magnetic disk, optical disk or flash card, for storing information, including instructions, that persists even when the computer system 1400 is turned off or otherwise loses power.

Information, including instructions for providing an origin-destination matrix using probe trajectory data, is provided to the bus 1410 for use by the processor from an external input device 1412, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1400. Other external devices coupled to bus 1410, used primarily for interacting with humans, include a display device 1414, such as a cathode ray tube (CRT), a liquid crystal display (LCD), a light emitting diode (LED) display, an organic LED (OLED) display, a plasma screen, or a printer for presenting text or images, and a pointing device 1416, such as a mouse, a trackball, cursor direction keys, or a motion sensor, for controlling a position of a small cursor image presented on the display 1414 and issuing commands associated with graphical elements presented on the display 1414, and one or more camera sensors 1494 for capturing, recording and causing to store one or more still and/or moving images (e.g., videos, movies, etc.) which also may comprise audio recordings. In some embodiments, for example, in embodiments in which the computer system 1400 performs all functions automatically without human input, one or more of external input device 1412, display device 1414 and pointing device 1416 may be omitted.

In the illustrated embodiment, special purpose hardware, such as an application specific integrated circuit (ASIC) 1420, is coupled to bus 1410. The special purpose hardware is configured to perform operations not performed by processor 1402 quickly enough for special purposes. Examples of ASICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a one-way or two-way communication coupling to a variety of external devices that operate with their own processors, such as printers, scanners and external disks. In general the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. For wireless links, the communications interface 1470 sends or receives or both sends and receives electrical, acoustic or electromagnetic signals, including infrared and optical signals, that carry information streams, such as digital data. For example, in wireless handheld devices, such as mobile telephones like cell phones, the communications interface 1470 includes a radio band electromagnetic transmitter and receiver called a radio transceiver. In certain embodiments, the communications interface 1470 enables connection to the communication network 105 for providing an origin-destination matrix using probe trajectory data to the UE 101.

The term "computer-readable medium" as used herein refers to any medium that participates in providing information to processor 1402, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1408. Volatile media include, for example, dynamic memory 1404. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1420.

Network link 1478 typically provides information communication using transmission media through one or more networks to other devices that use or process the information. For example, network link 1478 may provide a connection through local network 1480 to a host computer 1482 or to equipment 1484 operated by an Internet Service Provider (ISP). ISP equipment 1484 in turn provides data communication services through the public, world-wide packet-switching communication network of networks now commonly referred to as the Internet 1490.

A computer called a server host 1492 connected to the Internet hosts a process that provides a service in response to information received over the Internet. For example, server host 1492 hosts a process that provides information representing video data for presentation at display 1414. It is contemplated that the components of system 1400 can be deployed in various configurations within other computer systems, e.g., host 1482 and server 1492.

At least some embodiments of the invention are related to the use of computer system 1400 for implementing some or all of the techniques described herein. According to one embodiment of the invention, those techniques are performed by computer system 1400 in response to processor 1402 executing one or more sequences of one or more processor instructions contained in memory 1404. Such instructions, also called computer instructions, software and program code, may be read into memory 1404 from another computer-readable medium such as storage device 1408 or network link 1478. Execution of the sequences of instructions contained in memory 1404 causes processor 1402 to perform one or more of the method steps described herein. In alternative embodiments, hardware, such as ASIC 1420, may be used in place of or in combination with software to implement the invention. Thus, embodiments of the invention are not limited to any specific combination of hardware and software, unless otherwise explicitly stated herein.

The signals transmitted over network link 1478 and other networks through communications interface 1470, carry information to and from computer system 1400. Computer system 1400 can send and receive information, including program code, through the networks 1480, 1490 among others, through network link 1478 and communications interface 1470. In an example using the Internet 1490, a server host 1492 transmits program code for a particular application, requested by a message sent from computer 1400, through Internet 1490, ISP equipment 1484, local network 1480 and communications interface 1470. The received code may be executed by processor 1402 as it is received, or may be stored in memory 1404 or in storage device 1408 or any other non-volatile storage for later execution, or both. In this manner, computer system 1400 may obtain application program code in the form of signals on a carrier wave.

Various forms of computer readable media may be involved in carrying one or more sequence of instructions or data or both to processor 1402 for execution. For example, instructions and data may initially be carried on a magnetic disk of a remote computer such as host 1482. The remote computer loads the instructions and data into its dynamic memory and sends the instructions and data over a telephone line using a modem. A modem local to the computer system 1400 receives the instructions and data on a telephone line and uses an infra-red transmitter to convert the instructions and data to a signal on an infra-red carrier wave serving as the network link 1478. An infrared detector serving as communications interface 1470 receives the instructions and data carried in the infrared signal and places information representing the instructions and data onto bus 1410. Bus 1410 carries the information to memory 1404 from which processor 1402 retrieves and executes the instructions using some of the data sent with the instructions. The instructions and data received in memory 1404 may optionally be stored on storage device 1408, either before or after execution by the processor 1402.

FIG. 15 illustrates a chip set or chip 1500 upon which an embodiment of the invention may be implemented. Chip set 1500 is programmed to providing an origin-destination matrix using probe trajectory data as described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1500 can be implemented in a single chip. It is further contemplated that in certain embodiments the chip set or chip 1500 can be implemented as a single "system on a chip." It is further contemplated that in certain embodiments a separate ASIC would not be used, for example, and that all relevant functions as disclosed herein would be performed by a processor or processors. Chip set or chip 1500, or a portion thereof, constitutes a means for performing one or more steps of providing user interface navigation information associated with the availability of functions. Chip set or chip 1500, or a portion thereof, constitutes a means for performing one or more steps of providing an origin-destination matrix using probe trajectory data.

In one embodiment, the chip set or chip 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1500 includes merely one or more processors and some software and/or firmware supporting and/or relating to and/or for the one or more processors.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform the inventive steps described herein to providing an origin-destination matrix using probe trajectory data. The memory 1505 also stores the data associated with or generated by the execution of the inventive steps.

Figure 16:
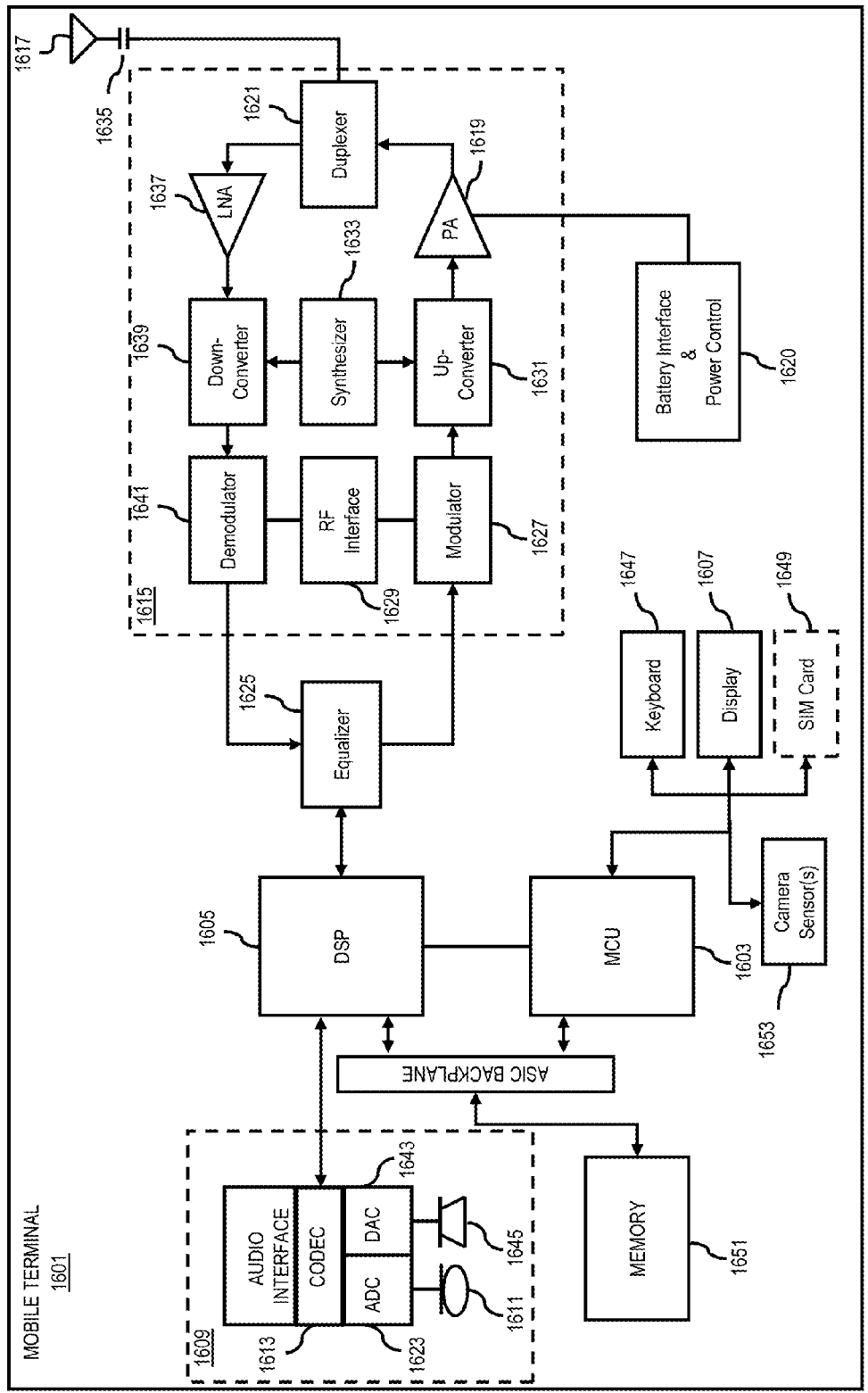
FIG. 16 is a diagram of a mobile terminal (e.g., handset) that can be used to implement an embodiment of the invention.

FIG. 16 is a diagram of exemplary components of a mobile terminal (e.g., handset) for communications, which is capable of operating in the system of FIG. 1, according to one embodiment. In some embodiments, mobile terminal 1601, or a portion thereof, constitutes a means for performing one or more steps of providing an origin-destination matrix using probe trajectory data. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1603, a Digital Signal Processor (DSP) 1605, and a receiver/transmitter unit including a microphone gain control unit and a speaker gain control unit. A main display unit 1607 provides a display to the user in support of various applications and mobile terminal functions that perform or support the steps of providing an origin-destination matrix using probe trajectory data. The display 1607 includes display circuitry configured to display at least a portion of a user interface of the mobile terminal (e.g., mobile telephone). Additionally, the display 1607 and display circuitry are configured to facilitate user control of at least some functions of the mobile terminal. An audio function circuitry 1609 includes a microphone 1611 and microphone amplifier that amplifies the speech signal output from the microphone 1611. The amplified speech signal output from the microphone 1611 is fed to a coder/decoder (CODEC) 1613.

A radio section 1615 amplifies power and converts frequency in order to communicate with a base station, which is included in a mobile communication system, via antenna 1617. The power amplifier (PA) 1619 and the transmitter/modulation circuitry are operationally responsive to the MCU 1603, with an output from the PA 1619 coupled to the duplexer 1621 or circulator or antenna switch, as known in the art. The PA 1619 also couples to a battery interface and power control unit 1620.

In use, a user of mobile terminal 1601 speaks into the microphone 1611 and his or her voice along with any detected background noise is converted into an analog voltage. The analog voltage is then converted into a digital signal through the Analog to Digital Converter (ADC) 1623. The control unit 1603 routes the digital signal into the DSP 1605 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1625 for compensation of any frequency-dependent impairments that occur during transmission though the air such as phase and amplitude distortion. After equalizing the bit stream, the modulator 1627 combines the signal with a RF signal generated in the RF interface 1629. The modulator 1627 generates a sine wave by way of frequency or phase modulation. In order to prepare the signal for transmission, an up-converter 1631 combines the sine wave output from the modulator 1627 with another sine wave generated by a synthesizer 1633 to achieve the desired frequency of transmission. The signal is then sent through a PA 1619 to increase the signal to an appropriate power level. In practical systems, the PA 1619 acts as a variable gain amplifier whose gain is controlled by the DSP 1605 from information received from a network base station. The signal is then filtered within the duplexer 1621 and optionally sent to an antenna coupler 1635 to match impedances to provide maximum power transfer. Finally, the signal is transmitted via antenna 1617 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1601 are received via antenna 1617 and immediately amplified by a low noise amplifier (LNA) 1637. A down-converter 1639 lowers the carrier frequency while the demodulator 1641 strips away the RF leaving only a digital bit stream. The signal then goes through the equalizer 1625 and is processed by the DSP 1605. A Digital to Analog Converter (DAC) 1643 converts the signal and the resulting output is transmitted to the user through the speaker 1645, all under control of a Main Control Unit (MCU) 1603 which can be implemented as a Central Processing Unit (CPU).

The MCU 1603 receives various signals including input signals from the keyboard 1647. The keyboard 1647 and/or the MCU 1603 in combination with other user input components (e.g., the microphone 1611) comprise a user interface circuitry for managing user input. The MCU 1603 runs a user interface software to facilitate user control of at least some functions of the mobile terminal 1601 to providing an origin-destination matrix using probe trajectory data. The MCU 1603 also delivers a display command and a switch command to the display 1607 and to the speech output switching controller, respectively. Further, the MCU 1603 exchanges information with the DSP 1605 and can access an optionally incorporated SIM card 1649 and a memory 1651. In addition, the MCU 1603 executes various control functions required of the terminal. The DSP 1605 may, depending upon the implementation, perform any of a variety of conventional digital processing functions on the voice signals. Additionally, DSP 1605 determines the background noise level of the local environment from the signals detected by microphone 1611 and sets the gain of microphone 1611 to a level selected to compensate for the natural tendency of the user of the mobile terminal 1601.

The CODEC 1613 includes the ADC 1623 and DAC 1643. The memory 1651 stores various data including call incoming tone data and is capable of storing other data including music data received via, e.g., the global Internet. The software module could reside in RAM memory, flash memory, registers, or any other form of writable storage medium known in the art. The memory device 1651 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1649 carries, for instance, important information, such as the cellular phone number, the carrier supplying service, subscription details, and security information. The SIM card 1649 serves primarily to identify the mobile terminal 1601 on a radio network. The card 1649 also contains a memory for storing a personal telephone number registry, text messages, and user specific mobile terminal settings.

Further, one or more camera sensors 1653 may be incorporated onto the mobile station 1601 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving, via a network by an apparatus, probe trajectory data collected at a subset of a plurality of travel nodes in a geographic area, wherein the probe trajectory data is generated from sensor data collected by global position system receivers when passing through the subset of the travel nodes, and wherein one or more actual travel origins and one or more final travel destinations of vehicles carrying the global position system receivers are shortened from the probe trajectory data, before being received by the apparatus;

processing, by the apparatus, the probe trajectory data based on a time-dependent transportation network graph (1) to construct a plurality of microscopic origin-destination matrices, wherein the microscopic origin-destination matrices includes a deterministic origin-destination matrix (2) and a probabilistic origin-destination matrix (3) that represent a plurality of preferred travel paths through the subset of the plurality of travel nodes in the geographic area, wherein the time-dependent transportation network graph has an adjacent weight matrix that contains a composite weight of d=a length of an arc (ij), tt=an average travel time to move from an origin node i to a destination node j, k=a probe-path count and t=an instantaneous time or epoch, KSP=a K-shortest path algorithm on the graph, r=each route generated by a K-shortest path; wherein, $$G_{ij}(t)=w(d,tt,k) \quad (1),$$

$$OD_{ij}(t)=w(tt,k) \quad (2),$$

$$OD'_{ij} = w\left(\frac{\sum_{r=1}^{n} KSPij(t, tt_r)}{n}, \sum_{r=1}^{n} KSPij(t, k_r)\right); \quad (3)$$

initiating an aggregation of the microscopic origin-destination matrices to construct at least one aggregated origin-destination matrix to represent at least one preferred travel path of the plurality of travel nodes in the geographic area; and predicting and concurrently presenting on a user interface a plurality of traffic flows of the plurality of travel nodes in the geographic area based on the at least one aggregated origin-destination matrix.

2. A method of claim 1, wherein the microscopic origin-destination matrices, the at least one aggregated origin-destination matrix, or a combination thereof include one or more stochastic origin-destination matrices, wherein $KSP_{ij}(t,k_r)$ takes the route r and computes an estimated number of probe-paths that would arrive at the destination node j given an amount that departed from the origin node i as in the deterministic origin-destination matrix (2), and wherein $KSP_{ij}(t,tt_r)$ estimates a total travel time it would take to move from the origin node i via the route r to the destination node j.

3. A method of claim 2, further comprising:

processing the probe trajectory data to determine one or more observed travel paths through the subset of the plurality of travel nodes; and initiating a construction of one or more deterministic matrices based on the one or more observed travel paths, wherein all of the actual travel origins and all of the final travel destinations of the probe trajectory data are shortened from the probe trajectory data by a probe trajectory data provider, before being received by the apparatus, and where n=3 for starting with top three shortest paths and a time interval of three hours, to generate eight time epochs in twenty-four hours.

4. A method of claim 3, further comprising:

determining one or more candidate travel paths through the plurality of travel nodes, wherein the one or more candidate travel paths are not observed in the probe trajectory data; and initiating a construction of the one or more stochastic origin-destination matrices based on the one or more candidate paths, wherein identification of the vehicles is anonymized from the probe trajectory data by the probe trajectory data provider, before being received by the apparatus.

5. A method of claim 4, further comprising:

initiating a selection of the one or more candidate travel paths based on at least one shortest path between at least one originating endpoint node and at least one terminating endpoint node within the plurality of travel nodes, wherein the global position system receivers are built in one or more mobile user devices, the vehicles, or a combination thereof.

6. A method of claim 5, further comprising:

initiating an identification of a set of possible paths between the at least one originating endpoint node and the at least one terminating endpoint node; and initiating a sorting of the set of possible paths based on length;

wherein the one or more candidate travel paths include, at least in part, a predetermined number of the set of possible paths with a shortest length.

7. A method of claim 1, further comprising:

initiating a construction of the microscopic origin-destination matrices, the at least one aggregated origin-destination matrix, or a combination thereof with respect to one or more time epochs, one or more contextual parameters, or a combination thereof, wherein the plurality of preferred travel paths through the subset of the travel nodes include a shortest travel path and all other travel paths through the subset of the travel nodes in the geographic area.

8. A method of claim 1, further comprising:

calculating probability information for the preferred travel paths per each node of the subset of the plurality of travel nodes, wherein the probability information indicates a probability of the preferred travel paths most often taken by the vehicles traveling through the respective node.

9. A method of claim 1, further comprising:

processing mapping data, the probe trajectory data, or a combination thereof to determine the subset of the plurality of travel nodes, the plurality of travel nodes, one or more links among the plurality of travel nodes, or a combination thereof.

10. A method of claim 1, wherein the probe trajectory data include satellite-based location probe data.

11. An apparatus comprising:

at least one processor; and at least one memory including computer program code for one or more programs, the at least one memory and the computer program code configured to, with the at least one processor, cause the apparatus to perform at least the following, receive, via a network, probe trajectory data collected at a subset of a plurality of travel nodes in a geographic area, wherein the probe trajectory data is generated from sensor data collected by global position system receivers when passing through the subset of the travel nodes, and wherein one or more actual travel origins and one or more final travel destinations of vehicles carrying the global position system receivers are shortened from the probe trajectory data, before being received by the apparatus;

process the probe trajectory data based on a time-dependent transportation network graph (1) to construct a plurality of microscopic origin-destination matrices, wherein the microscopic origin-destination matrices includes a deterministic origin-destination matrix (2) and a probabilistic origin-destination matrix (3) that represent a plurality of preferred travel paths through the subset of the plurality of travel nodes in the geographic area, wherein the time-dependent transportation network graph has an adjacent weight matrix that contains a composite weight of d=a length of an arc (ij), tt=an average travel time to move from an origin node i to a destination node j, k=a probe-path count and t=an instantaneous time or epoch, KSP=a K-shortest path algorithm on the graph, r=each route generated by a K-shortest path;

wherein, $$G_{ij}(t) = w(d, tt, k) \quad (1),$$

$$OD_{ij}(t) = w(tt, k) \quad (2),$$

$$OD'_{ij} = w\left(\frac{\sum_{r=1}^{n} KSPij(t, ttr)}{n}, \sum_{r=1}^{n} KSPij(t, k_r)\right); \quad (3)$$

initiate an aggregation of the microscopic origin-destination matrices to construct at least one aggregated origin-destination matrix to represent at least one preferred travel path of the plurality of travel nodes in the geographic area; and predict and concurrently present on a user interface a plurality of traffic flows of the plurality of travel nodes in the geographic area based on the at least one aggregated origin-destination matrix.

12. An apparatus of claim 11, wherein the microscopic origin-destination matrices, the at least one aggregated origin-destination matrix, or a combination thereof include one or more stochastic origin-destination matrices, wherein $KSP_{ij}(t, k_r)$ takes the route r and computes an estimated number of probe-paths that would arrive at the destination node j given an amount that departed from the origin node i as in the deterministic origin-destination matrix (2), and wherein $KSP_{ij}(t, tt_r)$ estimates a total travel time it would take to move from the origin node i via the route r to the destination node j.

13. An apparatus of claim 12, further comprising:

process the probe trajectory data to determine one or more observed travel paths through the subset of the plurality of travel nodes; and initiate a construction of one or more deterministic matrices based on the one or more observed travel paths, where n=3 for starting with top three shortest paths and a time interval of three hours, to generate eight time epochs in twenty-four hours.

14. An apparatus of claim 13, further comprising:

determine one or more candidate travel paths through the plurality of travel nodes, wherein the one or more candidate travel paths are not observed in the probe trajectory data; and initiate a construction of the one or more stochastic origin-destination matrices based on the one or more candidate paths.

15. An apparatus of claim 14, further comprising:

initiate a selection of the one or more candidate travel paths based on at least one shortest path between at least one originating endpoint node and at least one terminating endpoint node within the plurality of travel nodes.

16. An apparatus of claim 15, further comprising:

initiate an identification of a set of possible paths between the at least one originating endpoint node and the at least one terminating endpoint node; and initiate a sorting of the set of possible paths based on length;

wherein the one or more candidate travel paths include a predetermined number of the set of possible paths with a shortest length.

17. An apparatus of claim 11, further comprising:

initiate a construction of the microscopic origin-destination matrices, the at least one aggregated origin-destination matrix, or a combination thereof with respect to one or more time epochs, one or more contextual parameters, or a combination thereof.

18. A non-transitory computer-readable storage medium carrying one or more sequences of one or more instructions which, when executed by one or more processors, cause an apparatus to at least perform the following steps:

receiving, via a network, probe trajectory data collected at a subset of a plurality of travel nodes in a geographic area, wherein the probe trajectory data is generated from sensor data collected by global position system receivers when passing through the subset of the travel nodes, and wherein one or more actual travel origins and one or more final travel destinations of vehicles carrying the global position system receivers are shortened from the r probe trajectory data, before being received by the apparatus;

processing, by the apparatus, the probe trajectory data based on a time-dependent transportation network graph (1) to construct a plurality of microscopic origin-destination matrices, wherein the microscopic origin-destination matrices includes a deterministic origin-destination matrix (2) and a probabilistic origin-destination matrix 3) that represent a plurality of preferred travel paths through the subset of the plurality of travel nodes in the geographic area, wherein the time-dependent transportation network graph has an adjacent weight matrix that contains a composite weight of d=a length of an arc (ij), tt=an average travel time to move from an origin node i to a destination node j, k=a probe-path count and t=an instantaneous time or epoch, KSP=a K-shortest path algorithm on the graph, r=each route generated by a K-shortest path;

wherein, $$G_{ij}(t) = w(d, tt, k) \quad (1),$$

$$OD_{ij}(t) = w(tt, k) \quad (2),$$

$$OD'_{ij} = w\left(\frac{\sum_{r=1}^{n} KSPij(t, ttr)}{n}, \sum_{r=1}^{n} KSPij(t, k_r)\right); \quad (3)$$

initiating an aggregation of the microscopic origin-destination matrices to construct at least one aggregated origin-destination matrix to represent at least one preferred travel path of the plurality of travel nodes in the geographic area; and predicting and concurrently presenting on a user interface a plurality of traffic flows of the plurality of travel nodes in the geographic area based on the at least one aggregated origin-destination matrix.

19. A non-transitory computer-readable storage medium of claim 18, wherein the microscopic origin-destination matrices, the at least one aggregated origin-destination matrix, or a combination thereof include one or more stochastic origin-destination matrices, wherein $KSP_{ij}(t,k_r)$ takes the route r and computes an estimated number of probe-paths that would arrive at the destination node j given an amount that departed from the origin node i as in the deterministic origin-destination matrix (2), and wherein $KSP_{ij}(t,tt_r)$ estimates a total travel time it would take to move from the origin node i via the route r to the destination node j.

20. A method of claim 8, further comprising:

calculating a probability of a traffic flow for adjacent travel nodes of the subset based on the probability of each of the adjacent travel nodes.

* * * * *